(12) United States Patent
Cooke et al.

(10) Patent No.: US 8,452,148 B2
(45) Date of Patent: May 28, 2013

(54) INDEPENDENTLY TRANSLATABLE MODULES AND FIBER OPTIC EQUIPMENT TRAYS IN FIBER OPTIC EQUIPMENT

(75) Inventors: Terry L. Cooke, Hickory, NC (US); Tory A. Klavuhn, Newton, NC (US); David L. Dean, Jr., Hickory, NC (US); Juan Garcia, Tamaulipas (MX); Elmer Mariano, Tamaulipas (MX); Manuel Lopez, Tamaulipas (MX); Juan Miguel Gonzalez, Rio Bravo (MX)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/323,415

(22) Filed: Nov. 25, 2008

(65) Prior Publication Data

US 2010/0054682 A1   Mar. 4, 2010

Related U.S. Application Data

(60) Provisional application No. 61/190,538, filed on Aug. 29, 2008, provisional application No. 61/197,068, filed on Oct. 23, 2008.

(51) Int. Cl.
*G02B 6/00* (2006.01)
(52) U.S. Cl.
USPC .......................................................... 385/135
(58) Field of Classification Search
USPC .......................................................... 385/135
See application file for complete search history.

(56) References Cited

U.S. PATENT DOCUMENTS

| | | | |
|---|---|---|---|
| 620,013 | A | 2/1899 | Barnes |
| 3,175,873 | A | 3/1965 | Blomquist et al. |
| 4,792,203 | A | 12/1988 | Nelson et al. |
| 4,798,432 | A | 1/1989 | Becker et al. |

(Continued)

FOREIGN PATENT DOCUMENTS

| | | |
|---|---|---|
| CA | 2029592 C | 3/1998 |
| CH | 688705 A5 | 1/1998 |

(Continued)

OTHER PUBLICATIONS

Patent Cooperation Treaty, Annex to invitation to Pay Additional Fees for International Application No. PCT/US2009/004548, Jan. 19, 2010, 2 pages.

(Continued)

*Primary Examiner* — Uyen Chau N Le
*Assistant Examiner* — Chris Chu
(74) *Attorney, Agent, or Firm* — John H. Vynalek

(57) ABSTRACT

Fiber optic equipment that supports independently translatable fiber optic modules and/or fiber optic equipment trays containing one or more fiber optic modules is disclosed. In some embodiments, one or more fiber optic modules are disposed in a plurality of independently translatable fiber optic equipment trays which are received in a tray guide system. In this manner, each fiber optic equipment tray is independently translatable within the guide system. One or more fiber optic modules may also be disposed in one or more module guides disposed in the fiber optic equipment trays to allow each fiber optic module to translate independently of other fiber optic modules in the same fiber optic equipment tray. In other embodiments, a plurality of fiber optic modules are disposed in a module guide system disposed in the fiber optic equipment that translate independently of other fiber optic modules disposed within the module guide system.

20 Claims, 33 Drawing Sheets

U.S. PATENT DOCUMENTS

| | | | |
|---|---|---|---|
| 4,824,196 A | 4/1989 | Bylander | |
| 4,898,448 A | 2/1990 | Cooper | |
| 4,971,421 A | 11/1990 | Ori | |
| 5,001,602 A | 3/1991 | Suffi et al. | |
| 5,066,149 A | 11/1991 | Wheeler et al. | |
| 5,067,784 A | 11/1991 | Debortoli et al. | |
| 5,071,211 A | 12/1991 | Debortoli et al. | |
| 5,080,459 A | 1/1992 | Wettengel et al. | |
| 5,100,221 A | 3/1992 | Carney et al. | |
| 5,127,082 A | 6/1992 | Below et al. | |
| 5,133,039 A | 7/1992 | Dixit | |
| 5,138,688 A | 8/1992 | Debortoli | |
| 5,142,607 A | 8/1992 | Petrotta et al. | |
| 5,150,277 A | 9/1992 | Bainbridge et al. | |
| 5,167,001 A | 11/1992 | Debortoli et al. | |
| 5,231,687 A | 7/1993 | Handley | |
| 5,253,320 A | 10/1993 | Takahashi et al. | |
| 5,265,187 A | 11/1993 | Morin et al. | |
| 5,274,731 A | 12/1993 | White | |
| 5,285,515 A | 2/1994 | Milanowski et al. | |
| 5,323,478 A | 6/1994 | Milanowski et al. | |
| 5,337,400 A | 8/1994 | Morin et al. | |
| 5,339,379 A | 8/1994 | Kutsch et al. | 385/135 |
| 5,363,466 A | 11/1994 | Milanowski et al. | |
| 5,412,751 A | 5/1995 | Siemon et al. | |
| 5,442,725 A | 8/1995 | Peng | |
| 5,497,444 A * | 3/1996 | Wheeler | 385/135 |
| 5,511,144 A * | 4/1996 | Hawkins et al. | 385/135 |
| 5,519,804 A | 5/1996 | Burek et al. | |
| 5,572,617 A | 11/1996 | Bernhardt et al. | |
| 5,577,151 A | 11/1996 | Hoffer | |
| 5,613,030 A | 3/1997 | Hoffer et al. | |
| 5,717,810 A | 2/1998 | Wheeler | |
| 5,740,300 A | 4/1998 | Hodge | |
| 5,835,657 A | 11/1998 | Suarez et al. | |
| 5,887,106 A | 3/1999 | Cheeseman et al. | |
| 5,894,540 A | 4/1999 | Drewing | |
| 5,945,633 A | 8/1999 | Ott et al. | |
| 5,946,440 A | 8/1999 | Puetz | |
| 5,966,492 A | 10/1999 | Bechamps et al. | |
| 5,975,769 A | 11/1999 | Larson et al. | |
| 5,978,540 A * | 11/1999 | Bechamps et al. | 385/134 |
| 6,009,224 A | 12/1999 | Allen | |
| 6,058,235 A | 5/2000 | Hiramatsu et al. | |
| 6,215,938 B1 | 4/2001 | Reitmeier et al. | |
| 6,263,141 B1 | 7/2001 | Smith | |
| 6,301,424 B1 | 10/2001 | Hwang | |
| 6,322,279 B1 | 11/2001 | Yamamoto et al. | |
| 6,370,309 B1 | 4/2002 | Daoud | |
| 6,427,045 B1 | 7/2002 | Matthes et al. | |
| 6,438,310 B1 * | 8/2002 | Lance et al. | 385/135 |
| 6,456,773 B1 | 9/2002 | Keys | |
| 6,484,958 B1 | 11/2002 | Xue et al. | |
| 6,504,988 B1 | 1/2003 | Trebesch et al. | |
| 6,507,980 B2 | 1/2003 | Bremicker | |
| 6,600,866 B2 | 7/2003 | Gatica et al. | |
| RE38,311 E | 11/2003 | Wheeler | |
| 6,647,197 B1 | 11/2003 | Marrs et al. | |
| 6,677,520 B1 | 1/2004 | Kim et al. | |
| 6,715,619 B2 | 4/2004 | Kim et al. | |
| 6,719,149 B2 | 4/2004 | Tomino | |
| 6,741,785 B2 | 5/2004 | Barthel et al. | |
| 6,748,154 B2 | 6/2004 | Patel et al. | |
| 6,748,155 B2 | 6/2004 | Kim et al. | |
| 6,768,860 B2 | 7/2004 | Liberty | |
| 6,788,871 B2 | 9/2004 | Taylor | |
| 6,792,190 B2 | 9/2004 | Xin et al. | |
| 6,804,447 B2 | 10/2004 | Smith et al. | |
| 6,840,815 B2 | 1/2005 | Musolf et al. | |
| 6,865,331 B2 | 3/2005 | Mertesdorf | |
| 6,870,734 B2 | 3/2005 | Mertesdorf et al. | |
| 6,920,274 B2 * | 7/2005 | Rapp et al. | 385/135 |
| 6,925,241 B2 | 8/2005 | Bohle et al. | |
| 6,937,807 B2 | 8/2005 | Franklin et al. | |
| 6,944,383 B1 | 9/2005 | Herzog et al. | |
| 6,944,389 B2 | 9/2005 | Giraud et al. | |
| 6,968,111 B2 | 11/2005 | Trebesch et al. | |
| 6,993,237 B2 | 1/2006 | Cooke et al. | |
| 7,031,588 B2 | 4/2006 | Cowley et al. | |
| 7,068,907 B2 | 6/2006 | Schray | |
| 7,079,744 B2 | 7/2006 | Douglas et al. | |
| 7,101,093 B2 | 9/2006 | Hsiao et al. | |
| 7,102,884 B2 | 9/2006 | Mertesdorf et al. | |
| 7,113,686 B2 | 9/2006 | Bellekens et al. | |
| 7,113,687 B2 | 9/2006 | Womack et al. | |
| 7,116,883 B2 | 10/2006 | Kline et al. | |
| 7,118,281 B2 | 10/2006 | Chiu et al. | |
| 7,120,348 B2 | 10/2006 | Trebesch et al. | |
| 7,171,099 B2 | 1/2007 | Barnes et al. | |
| 7,195,521 B2 | 3/2007 | Musolf et al. | |
| 7,200,314 B2 | 4/2007 | Womack et al. | |
| 7,200,316 B2 | 4/2007 | Giraud et al. | |
| 7,231,125 B2 | 6/2007 | Douglas et al. | |
| 7,236,677 B2 | 6/2007 | Escoto et al. | |
| 7,245,809 B1 | 7/2007 | Gniadek et al. | |
| 7,259,325 B2 | 8/2007 | Pincu et al. | |
| 7,272,291 B2 | 9/2007 | Bayazit et al. | |
| 7,274,852 B1 | 9/2007 | Smrha et al. | |
| 7,298,950 B2 | 11/2007 | Frohlich | |
| 7,302,149 B2 | 11/2007 | Swam et al. | |
| 7,302,154 B2 | 11/2007 | Trebesch et al. | |
| 7,308,184 B2 | 12/2007 | Barnes et al. | |
| 7,325,975 B2 | 2/2008 | Yamada et al. | |
| 7,330,626 B2 | 2/2008 | Kowalczyk et al. | |
| 7,340,145 B2 | 3/2008 | Allen | |
| 7,349,615 B2 | 3/2008 | Frazier et al. | |
| 7,373,071 B2 | 5/2008 | Douglas et al. | |
| 7,376,323 B2 | 5/2008 | Zimmel | |
| 7,391,952 B1 | 6/2008 | Ugolini et al. | |
| 7,397,996 B2 | 7/2008 | Herzog et al. | |
| 7,400,813 B2 | 7/2008 | Zimmel | |
| 7,409,137 B2 | 8/2008 | Barnes | |
| 7,418,182 B2 | 8/2008 | Krampotich | |
| 7,418,184 B1 | 8/2008 | Gonzales et al. | |
| 7,437,049 B2 | 10/2008 | Krampotich | |
| 7,439,453 B2 | 10/2008 | Murano et al. | |
| 7,460,758 B2 | 12/2008 | Xin | |
| 7,463,810 B2 | 12/2008 | Bayazit et al. | |
| 7,463,811 B2 | 12/2008 | Trebesch et al. | |
| 7,474,828 B2 | 1/2009 | Leon et al. | |
| 7,480,438 B2 | 1/2009 | Douglas et al. | |
| 7,493,002 B2 | 2/2009 | Coburn et al. | |
| 7,499,622 B2 | 3/2009 | Castonguay et al. | |
| 7,499,623 B2 | 3/2009 | Barnes et al. | |
| 7,509,015 B2 | 3/2009 | Murano | |
| 7,509,016 B2 | 3/2009 | Smith et al. | |
| 7,526,172 B2 | 4/2009 | Gniadek et al. | |
| 7,526,174 B2 | 4/2009 | Leon et al. | |
| 7,555,193 B2 | 6/2009 | Rapp et al. | |
| 7,567,744 B2 | 7/2009 | Krampotich et al. | |
| 7,570,861 B2 | 8/2009 | Smrha et al. | |
| 7,577,331 B2 | 8/2009 | Laurisch et al. | |
| 7,613,377 B2 | 11/2009 | Gonzales et al. | |
| 7,853,112 B2 | 12/2010 | Zimmel et al. | |
| 2002/0181922 A1 | 12/2002 | Xin et al. | |
| 2004/0175090 A1 | 9/2004 | Vastmans et al. | |
| 2006/0018622 A1 | 1/2006 | Caveney et al. | |
| 2006/0193591 A1 | 8/2006 | Rapp et al. | 385/137 |
| 2006/0198098 A1 | 9/2006 | Clark et al. | |
| 2008/0025683 A1 | 1/2008 | Murano | |
| 2008/0063350 A1 | 3/2008 | Trebesch et al. | |
| 2008/0068788 A1 | 3/2008 | Ozawa et al. | |
| 2008/0069512 A1 | 3/2008 | Barnes et al. | |
| 2008/0080826 A1 | 4/2008 | Leon et al. | 385/135 |
| 2008/0080827 A1 | 4/2008 | Leon et al. | 385/135 |
| 2008/0080828 A1 | 4/2008 | Leon et al. | 385/135 |
| 2008/0089656 A1 | 4/2008 | Wagner et al. | |
| 2008/0118207 A1 | 5/2008 | Yamamoto et al. | |
| 2008/0152294 A1 | 6/2008 | Hirano et al. | |
| 2008/0175551 A1 | 7/2008 | Smrha et al. | |
| 2008/0175552 A1 * | 7/2008 | Smrha et al. | 385/135 |
| 2008/0205844 A1 | 8/2008 | Castonguay et al. | |
| 2008/0212928 A1 | 9/2008 | Kowalczyk et al. | |
| 2008/0219632 A1 | 9/2008 | Smith et al. | |
| 2008/0247723 A1 | 10/2008 | Herzog et al. | |
| 2008/0267573 A1 | 10/2008 | Douglas et al. | |
| 2008/0292261 A1 | 11/2008 | Kowalczyk et al. | |

| | | | |
|---|---|---|---|
| 2008/0310810 A1 | 12/2008 | Gallagher | |
| 2009/0022470 A1 | 1/2009 | Krampotich | |
| 2009/0060439 A1 | 3/2009 | Cox et al. | |
| 2009/0067800 A1 | 3/2009 | Vazquez et al. | |
| 2009/0097813 A1 | 4/2009 | Hill | |
| 2009/0136196 A1 | 5/2009 | Trebesch et al. | |
| 2009/0180749 A1 | 7/2009 | Douglas et al. | |
| 2009/0220204 A1 | 9/2009 | Ruiz | |
| 2009/0226142 A1 | 9/2009 | Barnes et al. | |
| 2009/0245743 A1* | 10/2009 | Cote et al. | 385/135 |
| 2009/0252472 A1 | 10/2009 | Solheid et al. | |
| 2009/0257727 A1 | 10/2009 | Laurisch et al. | |
| 2009/0290842 A1 | 11/2009 | Bran de Leon et al. | |
| 2009/0304342 A1 | 12/2009 | Adomeit et al. | |
| 2009/0324189 A1 | 12/2009 | Hill et al. | |
| 2010/0054682 A1 | 3/2010 | Cooke et al. | |
| 2010/0054685 A1 | 3/2010 | Cooke et al. | |
| 2010/0061693 A1 | 3/2010 | Bran de Leon et al. | |
| 2010/0074587 A1 | 3/2010 | Loeffelholz et al. | |
| 2010/0086274 A1 | 4/2010 | Keith | |
| 2010/0119201 A1 | 5/2010 | Smrha et al. | |

FOREIGN PATENT DOCUMENTS

| | | |
|---|---|---|
| DE | 4030301 A1 | 3/1992 |
| GB | 2241591 A | 9/1991 |
| JP | 3172806 A | 7/1991 |
| JP | 05045541 A | 2/1993 |
| JP | 06018749 A | 1/1994 |
| JP | 08007308 B2 | 1/1996 |
| JP | 08248235 A | 9/1996 |
| JP | 08248237 A | 9/1996 |
| JP | 08254620 A | 10/1996 |
| JP | 09258033 A | 10/1997 |
| JP | 09258055 A | 10/1997 |
| JP | 2771870 B2 | 7/1998 |
| JP | 10227919 A | 8/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 3279474 B2 | 4/2002 |
| JP | 2002169035 A | 6/2002 |
| JP | 3312893 B2 | 8/2002 |
| JP | 2002305389 A | 10/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 3448448 B2 | 9/2003 |
| JP | 3478944 B2 | 12/2003 |
| JP | 2003344701 A | 12/2003 |
| JP | 3487946 B2 | 1/2004 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 3107704 U | 12/2004 |
| JP | 2004361652 A | 12/2004 |
| JP | 2004361893 A | 12/2004 |
| JP | 2005055748 A | 3/2005 |
| JP | 2005062569 A | 3/2005 |
| JP | 2005084241 A | 3/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A | 8/2006 |
| JP | 3833638 B2 | 10/2006 |
| JP | 3841344 B2 | 11/2006 |
| JP | 3847533 B2 | 11/2006 |
| JP | 3896035 B2 | 3/2007 |
| JP | 2007067458 A | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A | 7/2008 |
| JP | 2008180817 A | 8/2008 |
| JP | 4184329 B2 | 11/2008 |
| JP | 2008542822 T | 11/2008 |
| JP | 2009503582 A | 1/2009 |
| WO | 9105281 A1 | 4/1991 |
| WO | 9825416 A1 | 6/1998 |
| WO | 0005611 A2 | 2/2000 |
| WO | 0242818 A1 | 5/2002 |
| WO | 2004052066 A1 | 6/2004 |

OTHER PUBLICATIONS

Unknown, "Evolant Solutions for Evolving Networks: Fiber Optic Hardware," Corning Cable Systems, EVO-03-EN, Oct. 2002, 2 pages.

Unknown, "Mass Termination Xchange (MTX): Equipment Patch Cord Interbay Vertical Channel," Standard Recommended Procedure (SRP) 003-684, Corning Cable Systems, Issue 1, Mar. 2005, pp. 1-8.

Unknown, "MTX Frames and Accessories, An Evolant Solutions Product," Corning Cable Systems, EVO-397-EN, Feb. 2006, 4 pages.

Unknown, "Mass Termination Xchange (MTX) Frame System: Equipment Office Planning and Application Guide," Standard Recommended Procedure (SRP) 003-664, Issue 1, Mar. 2005, 57 pages.

Unknown, "Enhanced Management Frame," Corning Evolant Solutions, Corning Cable Systems, EVO-1001-EN, Dec. 2009, 1 page.

Unknown, "Eclipse Hardware Family," Corning Evolant Solutions, Corning Cable Systems, EVO-998-EN, Nov. 2009, 1 page.

Unknown, "High-Density Frame (HDF) Connector-Splice Shelves and Housings: An Evolant Solutions Product," Corning Cable Systems, EVO-384-EN, May 2003, 1 page.

Unknown, "Enhanced Management Frame (EMF): An Evolant Solutions Product," Corning Evolant Solutions, Corning Cable Systems, EVO-278-EN, Nov. 2009, pp. 1-24.

Unknown, "Single Shelf HDF w/ Slack Storage and Heat Shield (HH1-CSH-1238-1V-BS)," Siecor Recommended Procedure (SRP) 003-475, Issue 1, Jan. 1998, pp. 1-12.

Unknown, "Corning Cable Systems Quick Reference Guide for Verizon FTTP FDH Products," Corning Cable Systems, EVO-479-EN, Jun. 2005, 4 pages.

Unknown, "Single Shelf HDF Installation," Standard Recommended Procedure (SRP) 003-377, Corning Cable Systems, Issue 5, Aug. 2001, pp. 1-12.

Unknown, "High Density Frame (HDF) Installation," Standard Recommended Procedure (SRP) 003-355, Corning Cable Systems, Issue 4, Sep. 2002, pp. 1-18.

Unknown, "High Density Frame," Corning Cable Systems, ICH. 106B.EN, Jul. 2001, 2 pages.

Unknown, "Fiber Optic Hardware with Factory-Installed Pigtails: An Evolant Solutions Product," Corning Cable Systems, EVO-379-EN, Nov. 2010, 12 pages.

Unknown, "Corning Cable Systems Products for BellSouth High Density Shelves," Corning Cable Systems, TEL-108A, Jun. 2000, 2 pages.

Annex to Form PCT/ISA/206, Communication Relating to the Results of the Partial International Search, for PCT/US2009/004548 mailed Jan. 19, 2010, 2 pages.

Annex to Form PCT/ISA/206, Communication Relating to the Results of the Partial International Search, for PCT/US2009/004549 mailed Feb. 10, 2010, 2 pages.

Unknown, "FOS-FDF", Corning Cable Systems, SRP-003-305, Issue 4, Mar. 2001, 17 pages.

Unknown, "FiberManager Frame Cross-connect Configuration Fiber Tracing Option: Installation and Maintenance," Siecor Corporation, A0402884, Release 04.00, Jul. 1995, 80 pages.

Unknown, "FiberManager System Frame and Components: An Evolant Solutions Product," Corning Cable Systems, EVO-356-EN, Jan. 2003, 12 pages.

Unknown, "FiberManager System 1- and 3-Position Compact Shelves: An Evolant Solutions Product," Corning Cable Systems, EVO-358-EN, Jan. 2003, 4 pages.

Unknown, "Optical Management Shelf (OMS)," Corning Cable Systems, Standard Recommended Procedure (SRP) 003-600, Issue 3, Apr. 2004, 9 pages.

Non-Final Rejection mailed Sep. 7, 2010, for U.S. Appl. No. 12/323,423, 18 pages.

Final Rejection mailed Mar. 3, 2011, for U.S. Appl. No. 12/323,423, 17 pages.

Advisory Action mailed May 12, 2011, for U.S. Appl. No. 12/323,423, 3 pages.

Non-Final Rejection mailed Aug. 5, 2011, for U.S. Appl. No. 12/323,423, 44 pages.

Non-final Office Action for U.S. Appl. No. 12/576,769 mailed Feb. 2, 2012, 23 pages.

European Search Report for patent application 09789090.9 mailed Apr. 5, 2011, 9 pages.

International Search Report for PCT/US2009/004548 mailed Mar. 19, 2010, 5 pages.

* cited by examiner

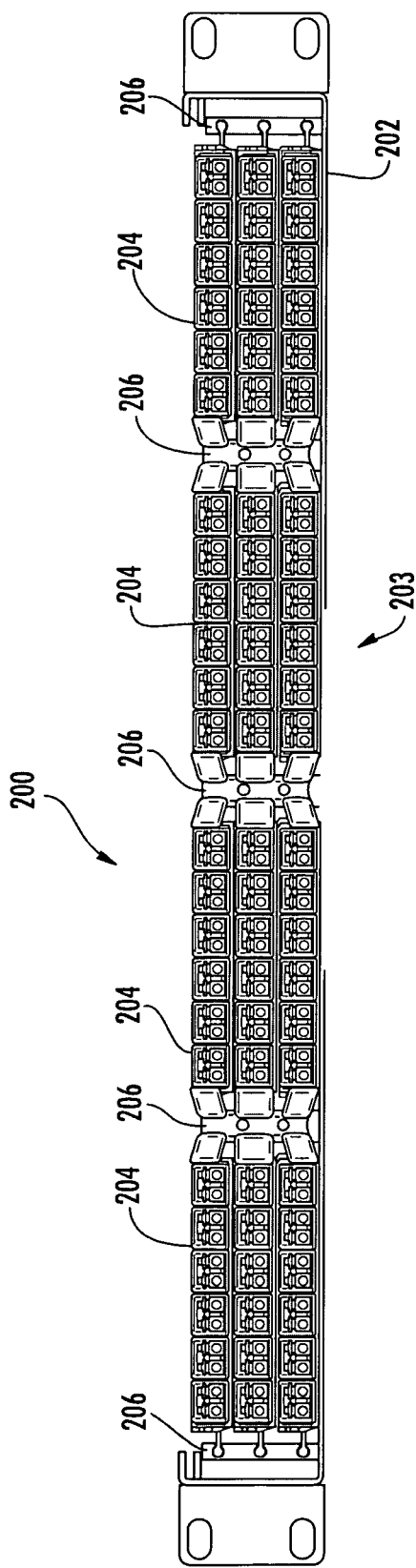
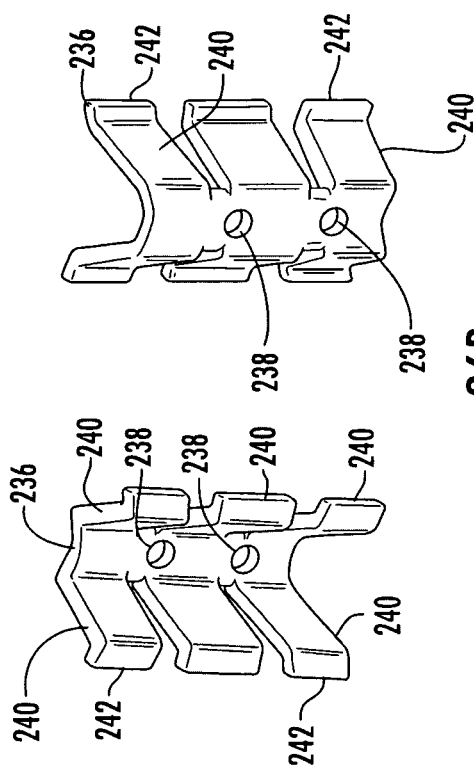
FIG. 26A
FIG. 26B

INDEPENDENTLY TRANSLATABLE MODULES AND FIBER OPTIC EQUIPMENT TRAYS IN FIBER OPTIC EQUIPMENT

RELATED APPLICATIONS

The present application claims priority to U.S. Provisional Patent Application Ser. No. 61/190,538 filed Aug. 29, 2008, entitled "High Density Data Center Hardware, Assemblies and Components," which is incorporated herein by reference in its entirety.

The present application also claims priority to U.S. Provisional Patent Application Ser. No. 61/197,068 filed Oct. 23, 2008, entitled "High Density Data Center Hardware, Assemblies and Components," which is incorporated herein by reference in its entirety.

The present application is related to co-pending U.S. patent application Ser. No. 12/323,423, entitled "Rear-Installable Fiber Optic Modules and Equipment" which is incorporated herein by reference in its entirety.

The present application is related to co-pending U.S. patent application Ser. No. 12/394,483, entitled "Rear Slidable Extension in Fiber Optic Equipment Tray" which is incorporated herein by reference in its entirety.

BACKGROUND

1. Field of the Disclosure

The technology of the disclosure relates to fiber optic modules for fiber optic equipment. The fiber optic modules can be included in fiber optic equipment rack and/or trays.

2. Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections.

The fiber optic equipment is customized based on the application need. The fiber optic equipment is typically included in housings that are mounted in equipment racks to maximize space. One example of such fiber optic equipment is a fiber optic module. A fiber optic module is designed to provide cable-to-cable fiber optic connections and manage the polarity of fiber optic cable connections. The fiber optic module is typically mounted to a chassis which is then mounted inside an equipment rack or housing. The chassis may be provided in the form of a tray that is extendable from the equipment rack like a drawer. This allows a technician access to fiber optic adapters disposed in the fiber optic module and any fiber optic cables connected to the fiber optic adapters without removing the fiber optic module from the equipment rack.

Due to increasing bandwidth needs and the need to provide high connectivity density in data centers for increased revenue generating opportunities, fiber optic networks are migrating to higher cable fiber counts. Multi-fiber cables are used to provide higher cable fiber counts and are used for trunk connections in a fiber optic network. In general, higher density connections make it more difficult to access optical components and connections. The same is true for fiber optic modules because of the increased number of fiber optic adapters disposed in the fiber optic modules to handle the higher connectivity density. Increased density makes hand access to optical components and connectors as well as the routing and organizing jumper connections more difficult. Even with fiber optic equipment tray pull out capabilities, a need still exists to improve access to optical components in a fiber optic equipment tray as well as provide neat routing and organization of jumper connections.

SUMMARY OF THE DETAILED DESCRIPTION

Embodiments disclosed in the detailed description include fiber optic equipment and apparatuses that support independently translatable fiber optic modules and/or fiber optic equipment trays containing one or more fiber optic modules. In some embodiments, one or more fiber optic modules are disposed in a plurality of independently translatable fiber optic equipment trays. The fiber optic equipment trays are received in a tray guide system disposed in the fiber optic equipment. In this manner, each fiber optic equipment tray is independently translatable within the guide system. The one or more fiber optic modules disposed in each fiber optic equipment tray translate with their respective fiber optic equipment tray when translated.

One or more module guides may also be disposed in each of the fiber optic equipment trays. The fiber optic modules can be disposed in one or more module guides. The fiber optic modules translate within the module guides. In this manner, each fiber optic module disposed in a given fiber optic equipment tray may translate independently of other fiber optic modules in the same fiber optic equipment tray as well as each fiber optic equipment tray being independently translatable to other fiber optic equipment trays within the tray guide system.

In other embodiments, a plurality of fiber optic modules is disposed in a module guide system in the fiber optic equipment without need or requirement for an intermediate fiber optic equipment tray. Each of the fiber optic modules translates independently of other fiber optic modules disposed within the module guide system. One or more fiber optic equipment trays may also be provided. The fiber optic equipment trays may contain a locking feature adjacent the front end of the fiber optic equipment that releasably retains one or more fiber optic modules when moved forward within the guide system towards the front end of the fiber optic equipment. In this manner, a fiber optic equipment tray may be pulled to translate a fiber optic module forward from the fiber optic equipment.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

BRIEF DESCRIPTION OF THE FIGURES

FIGS. 26A and 26B are a front view of the fiber optic equipment of FIG. 22 with fiber optic modules installed in all module guides and a locking feature to prevent the fiber optic modules from being pulled forward beyond a front end of the fiber optic equipment;

DETAILED DESCRIPTION OF THE PREFERRED EMBODIMENTS

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic equipment and apparatuses that support independently translatable fiber optic modules and/or fiber optic equipment trays containing one or more fiber optic modules. In some embodiments, one or more fiber optic modules are disposed in a plurality of independently translatable fiber optic equipment trays. The fiber optic equipment trays are received in a tray guide system disposed in the fiber optic equipment. In this manner, each fiber optic equipment tray is independently translatable within the guide system. The one or more fiber optic modules disposed in each fiber optic equipment tray translate with their respective fiber optic equipment tray when translated.

One or more module guides may also be disposed in each of the fiber optic equipment trays. The fiber optic modules can be disposed in one or more module guides. The fiber optic modules translate within the module guides. In this manner, each fiber optic module disposed in a given fiber optic equipment tray may translate independently of other fiber optic modules in the same fiber optic equipment tray as well as each fiber optic equipment tray being independently translatable to other fiber optic equipment trays within the tray guide system.

Figure 1:
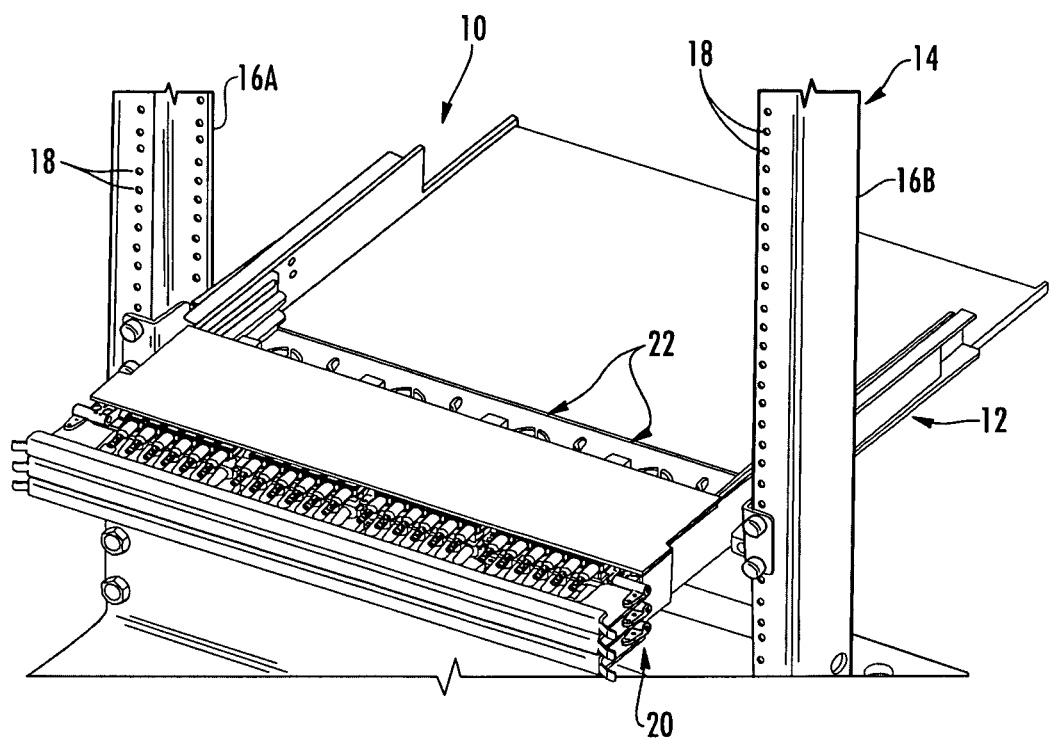
FIG. 1 is a front perspective view of an exemplary fiber optic equipment rack with exemplary fiber optic equipment supporting rear-installable fiber optic modules according to one embodiment.

In this regard, FIG. 1 illustrates exemplary fiber optic equipment 10. The fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more rear-installable fiber optic modules. The fiber optic modules can be fiber optic adapter modules or any other type of fiber optic modules or fiber optic apparatuses, including those that support fiber optic connections. Both the fiber optic modules and the fiber optic equipment trays are rear-installable, meaning they can be installed from a rear section of the fiber optic equipment 10. Further, both the fiber optic equipment trays and the fiber optic modules supported therein are independently translatable about the chassis for installation, access, and/or removal.

In this regard and as illustrated in FIG. 1, the fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the fiber optic equipment 10 inside the fiber optic equipment rack 14. The fiber optic equipment 10 is attached and supported by the fiber optic equipment rack 14 in the form of shelves that are stacked on top of each other within the vertical rails 16A, 16B. As illustrated, the fiber optic equipment 10 is attached to the vertical rails 16A, 16B. The fiber optic equipment rack 14 may support 1U-sized shelves, with "U" equal a standard 1.75 inches in height. As will be discussed in greater detail later in this application, the fiber optic equipment 10 includes a plurality of extendable fiber optic equipment trays 20 that each carries one or more rear-installable fiber optic modules 22. In this example, the fiber optic equipment 10 provides a density of 144 fibers, although it is not limited to this density. Further, as will also be described in more detail below, each fiber optic equipment tray 20 is independently translatable and accessible to access the fiber optic modules supported therein.

FIG. 2A illustrates a rear perspective view of the fiber optic equipment 10 illustrated in FIG. 1. The fiber optic equipment 10 is provided in the chassis 12 that defines a front end 24, a rear section 26, a first end 28, and a second end 30. The first end 28 of the chassis 12 is disposed on the opposite side of the second end 30 of the chassis 12. A guide system in the form of a rail guide system 32 is provided to support the rear-installable fiber optic modules 22. The rail guide system 32 comprises two tray rail guides 32A, 32B attached to the chassis 12 on the first end 28 and the second end 30, respectively. The tray rail guides 32A, 32B are configured to support one or more fiber optic equipment trays that support the fiber optic modules 22, which will be illustrated in FIG. 3 and described below. The tray rail guides 32A, 32B allow each fiber optic equipment tray 20 installed therein to be translated about the chassis 12. In this example, the chassis 12 supports three (3) fiber optic equipment trays 20 with each one stacked on top of each other. A tray cover 34 is disposed on top of the top fiber optic equipment tray 20 disposed in the chassis 12 and within the tray rail guides 32A, 32B. As will be discussed later in this application, each fiber optic equipment tray 20 contains a fiber routing tray 36 attached thereto to support routing of optical fibers connected to the fiber optic modules 22. The fiber routing tray 36 can be extended and lowered as desired to obtain access to the fiber optic modules 22 from the front end 24 of the fiber optic equipment 10.

FIG. 2B illustrates the tray rail guides 32A, 32B in more detail. As illustrated therein, the tray rail guides 32A, 32B form a series of channels 38A-38C, wherein each channel 38A-38C is configured to receive a fiber optic equipment tray 20. The tray rail guides 32A, 32B allow a plurality of fiber optic trays 20 arranged in a column format. The tray rail guides 32A, 32B comprise an end portion 40 by which the channels 38A-38C stop and the fiber optic equipment trays 20 cannot extend beyond. This end portion 40 is disposed in an orientation such that it is adjacent the rear section 26 of the fiber optic equipment 10. The tray rail guides 32A, 32B also contain an entry portion 42 through which the fiber optic equipment trays 20 can be inserted into the channels 38A-38C. Note that the entry portion 42 does not close off the channels 38A-38C such that the fiber optic equipment trays 20 can be extended beyond the entry portion 42 back towards the rear section 26 of the chassis 12. In this manner, the tray rail guides 32A, 32B support rear installation of fiber optic equipment trays 20 into the chassis 12 from the rear section 26.

Figure 3:
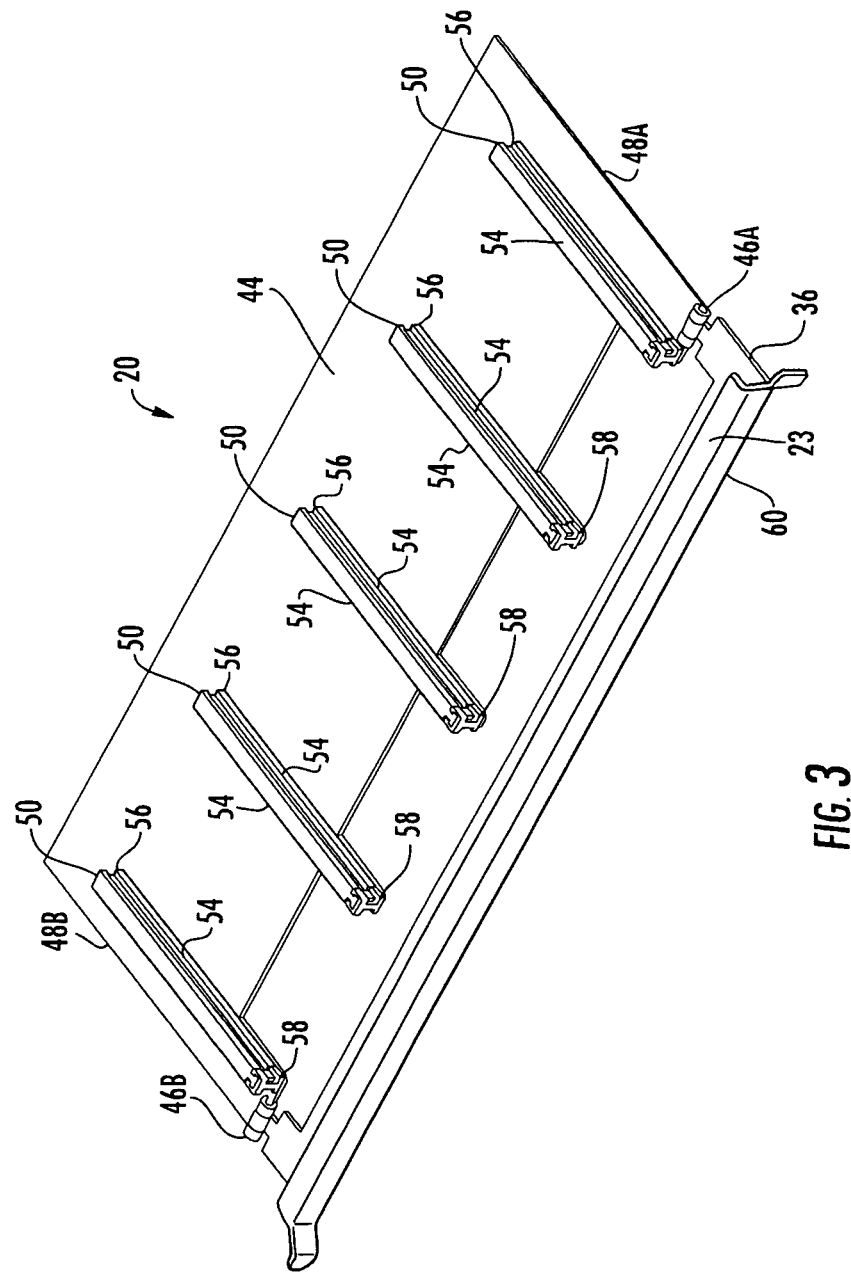
FIG. 3 is a front perspective view of an individual fiber optic equipment tray in the fiber optic equipment of FIG. 1 without rear-installable fiber optic modules installed in module guides disposed in the fiber optic equipment tray.

FIG. 3 illustrates an individual fiber optic equipment tray 20 not disposed in the chassis 12 or contained within the tray rail guides 32A, 32B for further discussion and illustration. As illustrated therein, the fiber optic equipment tray 20 contains a main tray portion 44 and the fiber routing tray 36 attached thereto. The fiber routing tray 36 is attached to the main tray portion 44 via hinge mechanisms in the form of hinges 46A, 46B disposed on each end 48A, 48B of the main tray portion 44. The main tray portion 44 contains a plurality of module guides in the form of module rail guides 50 that support the fiber optic modules 22. More specifically, the fiber optic modules 22 contain rails (elements 52A, 52B in FIG. 4) that couple to tray channels 54 disposed within the module rail guides 50. The fiber optic modules 22 are disposed in a row arrangement if at least one intermediate module rail guide 50 is disposed in the fiber optic equipment tray 20. Providing a plurality of tray channels 54 in each module rail guide 50 allows a plurality of fiber optic modules 22 to be stacked on top of each other in a column arrangement. The fiber optic modules 22 can be moved within the module rail guides 50 in the fiber optic equipment tray 20 either towards the front end 24 of the chassis 12 or the rear section 26 or the chassis 12. The fiber optic equipment trays 20 can also be moved about the tray rail guides 32A, 32B. In this manner, the fiber optic equipment trays 20 can be translated independently of each other about the tray rail guides 32A, 32B, and each of the fiber optic modules 22 within a given fiber optic equipment tray 20 can be independently translated within their respective module rail guides 50.

Note that in FIG. 3, the fiber optic equipment tray 20 contains five (5) module rail guides 50, which means that the fiber optic equipment tray 20 can support four (4) individual fiber optic modules 22. Four (4) fiber optic modules 22 can be installed in the fiber optic equipment tray 20 of FIG. 3, or less than four as desired or as required according to installation requirements. Also as shown in FIG. 3 and as illustrated in more detail in FIG. 4, the module rail guides 50 are configured such that the tray channels 54 are open on a rear end 56 of the module rail guides 50. This allows the fiber optic modules 22 to be rear-installable into the fiber optic equipment trays 20 from the rear section 26 of the chassis 12. More specifically, the fiber optic equipment tray 20 is disposed in the chassis 12 such that the rear ends 56 of the module rail guides 50 are oriented towards the rear section 26 of the chassis 12. Thus, as will be discussed in more detail below, the fiber optic modules 22 can be inserted into the rear ends 56 of the module rail guides 50 and pushed forward within the module rail guides 50 until the fiber optic modules 22 reach a front end 58 of each module rail guide 50. A locking feature not illustrated in FIG. 3, but described later below in this application, can be provided to prevent the fiber optic module 22 from extending beyond the front end 58 of the module rail guides 50 unless a release is engaged. In this manner, the fiber optic modules 22 can be installed from the rear of the chassis 12, but can also be extended and removed from the front end 24 of the chassis 12 as well.

Also as illustrated in FIG. 3, the fiber routing tray 36 is formed from sheet metal or other material that is bent on top of itself in a U-shape on a front end 60 of the fiber routing tray 36. In this manner, optic fibers extending from the fiber optic modules 22 installed in the fiber optic equipment tray 20, and in particular the module rail guides 50 disposed therein, can be routed underneath a lip section 23 contained in the fiber routing tray 36 and disposed to either end 48A, 48B of the fiber optic equipment tray 20 to be routed for connection to other fiber optic equipment.

Figure 2:
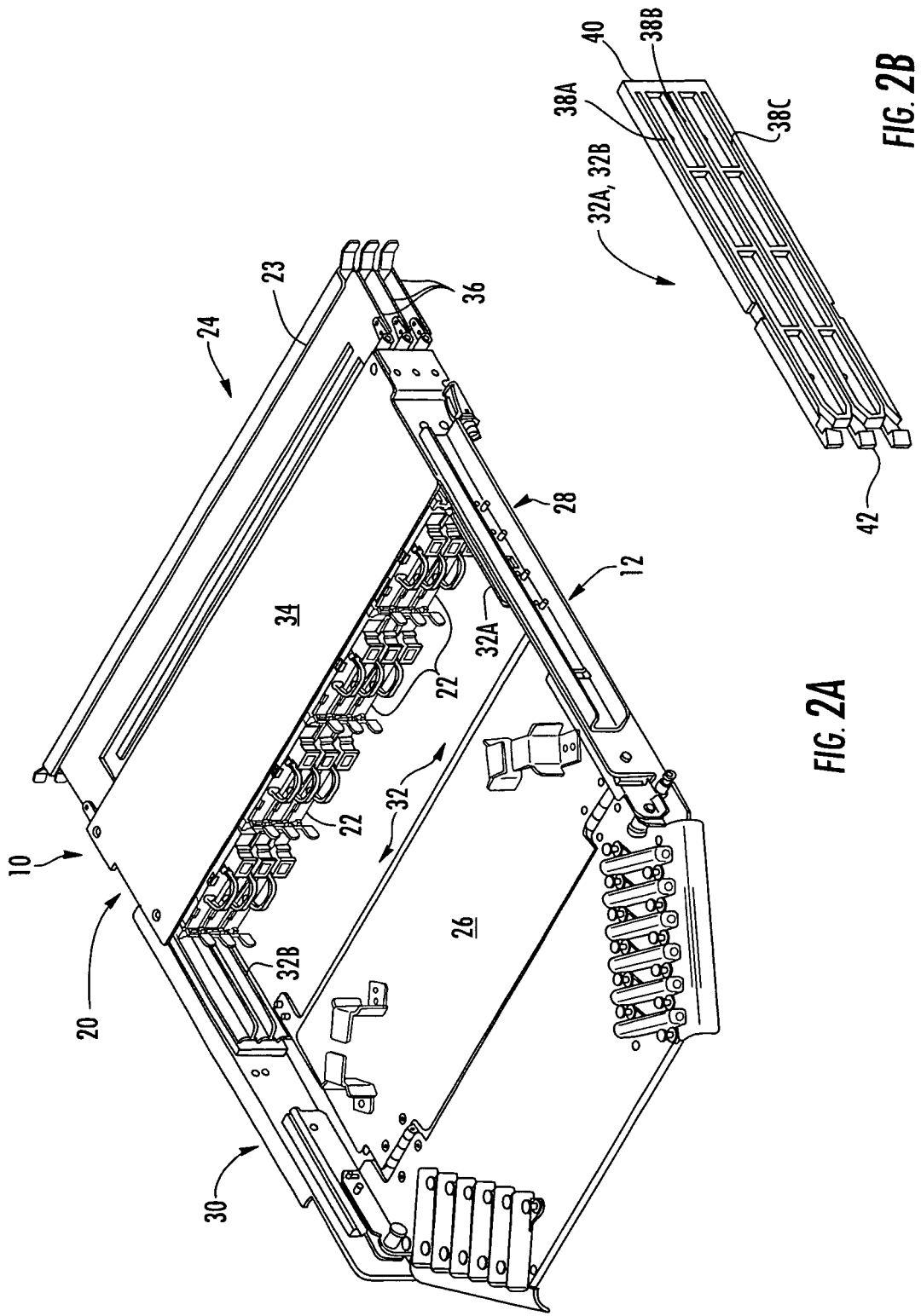
FIG. 2A is a rear perspective view of the fiber optic equipment supporting the rear-installable fiber optic modules of FIG. 1.
FIG. 2B is a perspective view of fiber optic equipment tray guides disposed in the fiber optic equipment of FIG. 1.
Figure 4:
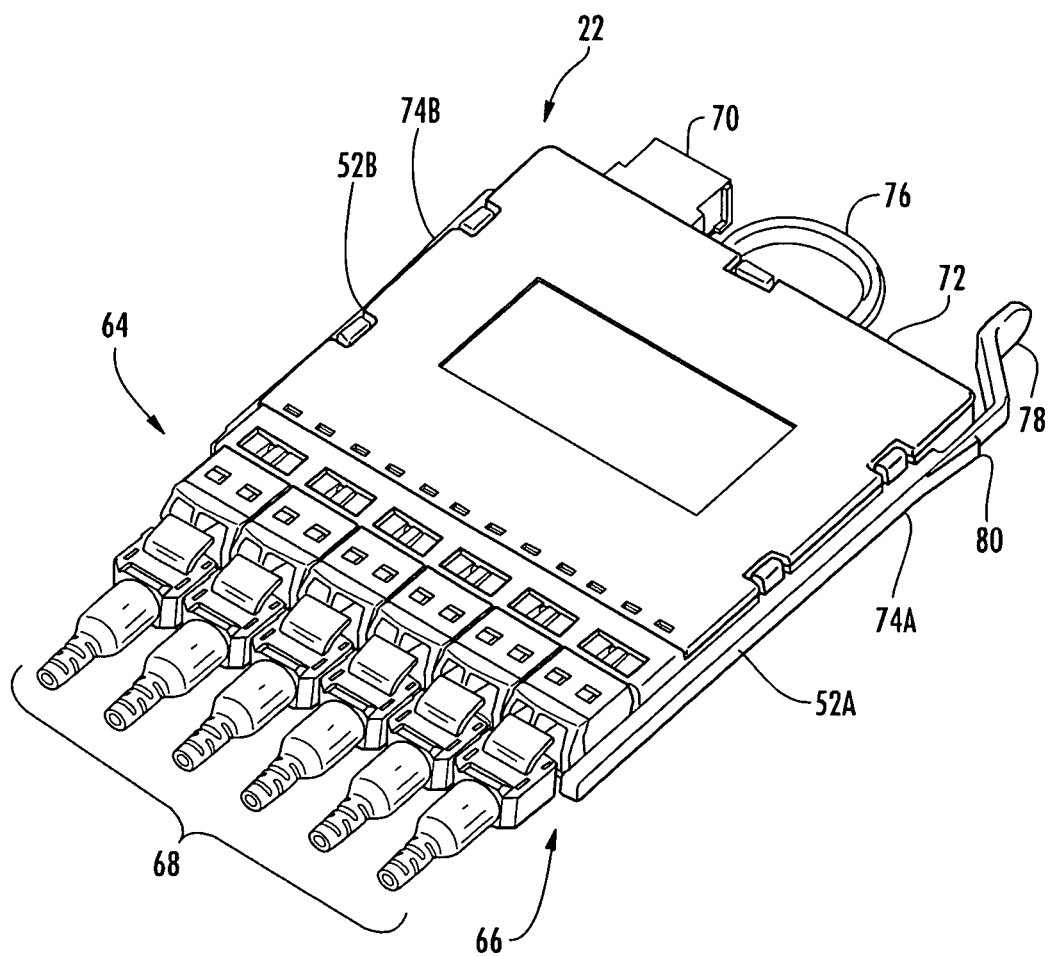
FIG. 4 is a front perspective view of a fiber optic module that is rear-installable in the fiber optic equipment tray of FIG. 3.

FIG. 4 illustrates an example of a fiber optic module 22 that is supported in the fiber optic equipment tray 20 in FIGS. 1-3. As illustrated therein, the fiber optic module 22 is comprised of a number of fiber optic adapters 64 disposed on a front end 66 of the fiber optic module 22. In this example, the fiber optic adapters 64 accept duplex LC fiber optic connectors 68. However, any fiber optic connection type desired can be provided in the fiber optic modules 22. Fiber optic cables (not shown) extend from the fiber optic connectors 68 to establish fiber optic connections with other equipment. Another fiber optic adapter 70 is disposed on a rear end 72 of the fiber optic module 22. In this example, the fiber optic adapter 70 is an MTP fiber optic adapter equipped to establish connections to up to twelve (12) optical fibers. The fiber optic module 22 may also manage polarity between the fiber optic connectors 68 and the fiber optic adapters 64 disposed on the front end 66 of the fiber optic module 22 and the fiber optic adapter 70 disposed on the rear end 72 of the fiber optic module 22.

Module rails 52A, 52B are disposed on each side 74A, 74B of the fiber optic module 22. The module rails 52A, 52B are configured to be inserted within the tray channels 54 of the module rail guides 50 in the fiber optic equipment tray 20 as illustrated in FIG. 3. In this manner, when it is desired to install the fiber optic module 22 in the fiber optic equipment tray 20, the front end 66 of the fiber optic module 22 can be inserted from the rear section 26 of the chassis 12. More specifically, the front end 66 of the fiber optic module 22 is inserted into the tray channels 54 of the module rail guides 50 at their rear ends 56. In this manner, the fiber optic module 22 is rear-installable in the fiber optic equipment tray 20 and the chassis 12. The fiber optic module 22 can then be pushed forward within the tray channels 54 until the fiber optic module 22 reaches the front end 58 of the module rail guides 50. In this manner, a technician can install a fiber optic connection to the fiber optic adapter 70 disposed on the rear end 72 of the fiber optic module 22 and can then install the fiber optic module 22 from the rear section 26 of the chassis 12 into the fiber optic equipment tray 20.

Figure 5:
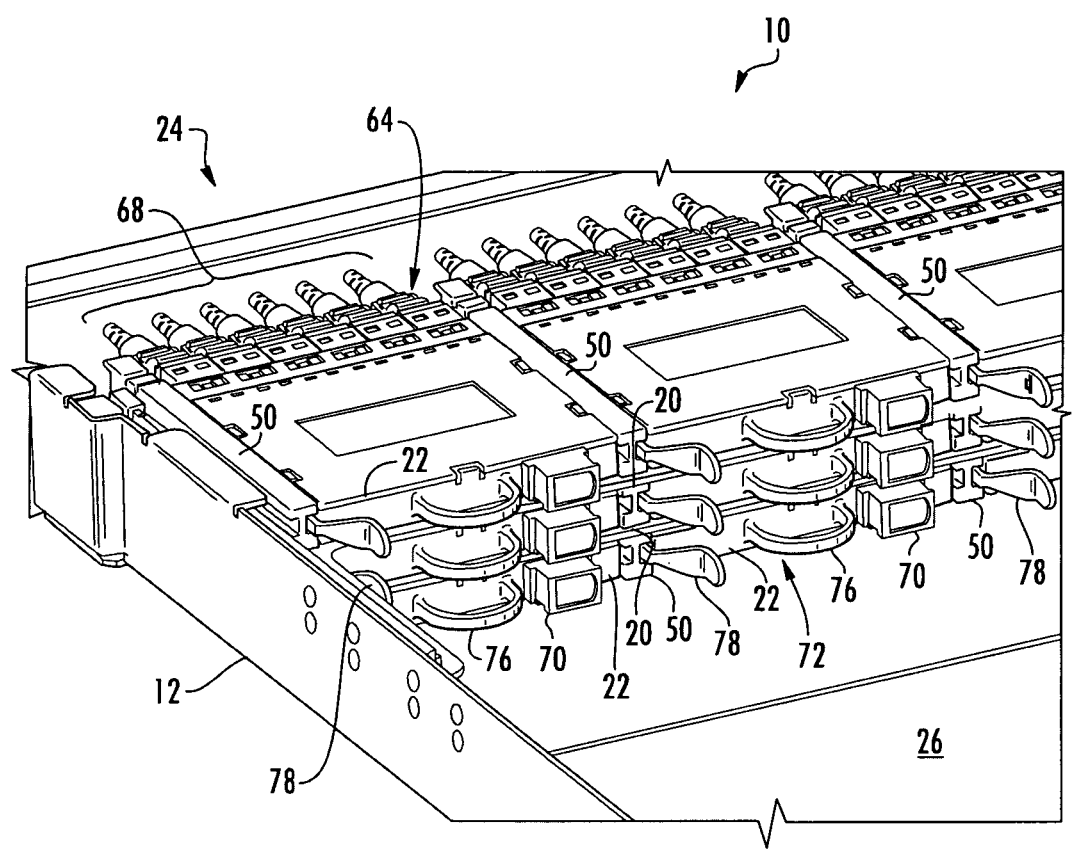
FIG. 5 is a rear perspective close-up view of the rear-installable fiber optic module of FIG. 4 installed in the fiber optic equipment tray of FIG. 3.

In this regard, FIG. 5 illustrates a rear perspective view of the fiber optic modules 22 installed in the fiber optic equipment trays 20 and the module rail guides 50 disposed therein. As illustrated therein, when the fiber optic module 22 is installed in the tray channels 54 of the module rail guides 50 from the rear section 26 of the chassis 12, the module rails 52A, 52B of the fiber optic module 22 move towards the front end 24 within the tray channels 54. The fiber optic module 22 can be moved towards the front end 24 until the fiber optic modules 22 reach a stop or locking feature disposed in the front end 24 as will described later in this application. A locking feature in the form of a locking latch 78 and a protrusion 80 (FIG. 4) engage a complementary protrusion disposed in the tray channel 54 such that the fiber optic module 22. The locking latch 78 is inwardly biased such that the fiber optic module 22 can be installed in the tray rail guides 32, but cannot be pulled back towards the rear section 26 of the chassis 12 until the locking latch 78 is disengaged to prevent the protrusion 80 from engaging with the module rail guides 50. The locking latch 78 is disengaged by pushing it inward towards the fiber optic module 22 to release the protrusion 80 from the tray channel 54.

If it is desired to remove the fiber optic module 22 from the fiber optic equipment tray 20, the fiber optic module 22 can be removed from either the rear section 26 of the chassis 12 or from the front end 24 of the chassis 12. To remove the fiber optic module 22 from the rear section 26 of the chassis 12, a pulling loop 76 disposed in the rear end 72 of the fiber optic module 22 can be pulled once the locking latch 78 is disengaged inward. The locking latch 78 controls the position of the protrusion 80 extending outward from the module rail 52A such that when the fiber optic module 22 is extended along a certain portion of the module rail guides 50, the protrusion 80 prevents the fiber optic module 22 from moving backwards along the tray channels 54 towards the rear section 26 of the chassis 12.

Figure 6:
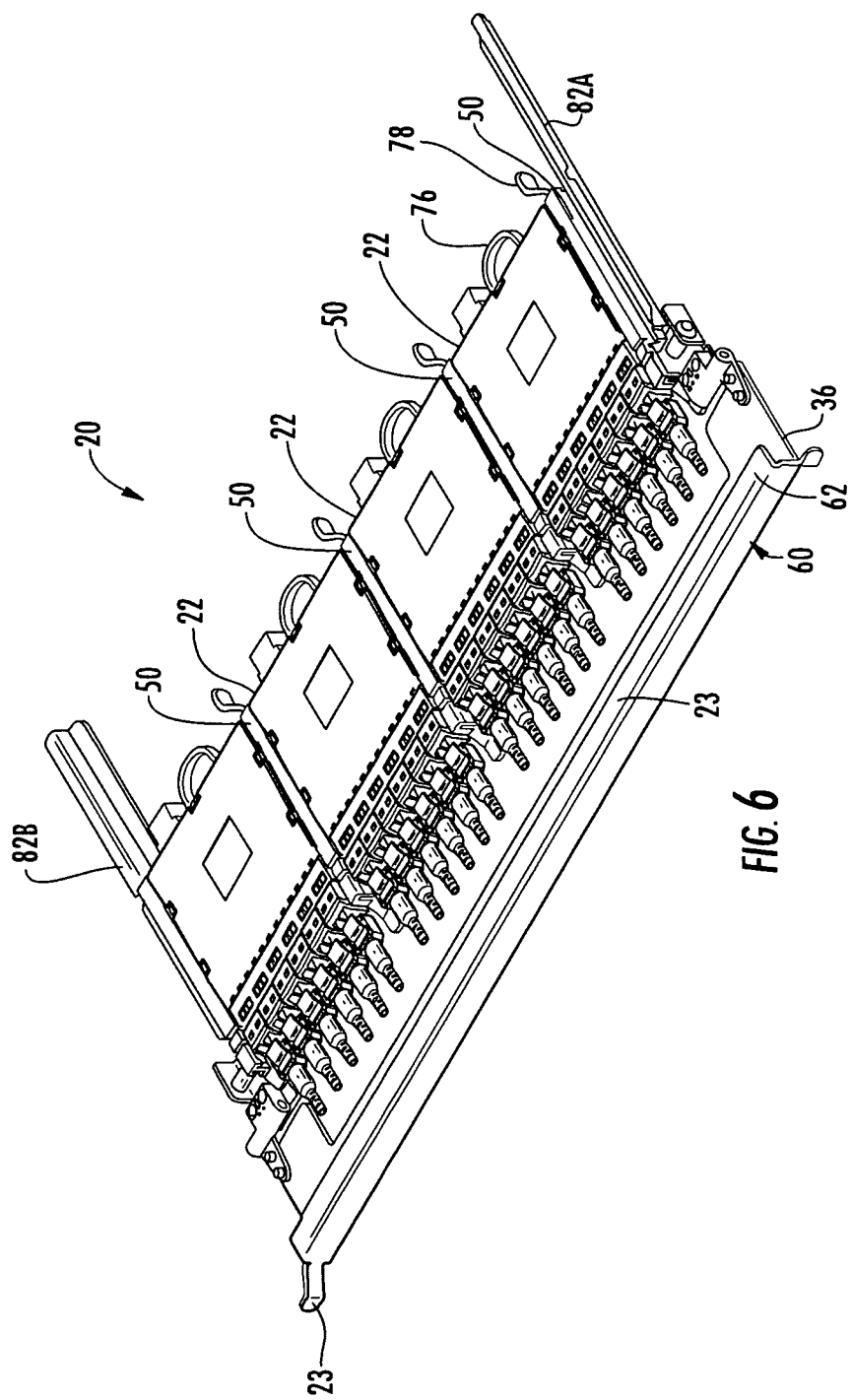
FIG. 6 is a front perspective view of the fiber optic equipment tray of FIG. 3 with rear-installable fiber optic modules installed in the module guides.

FIG. 6 illustrates the fiber optic equipment tray 20 of FIG. 3; however, with the rear-installable fiber optic modules 22 installed therein. The fiber optic modules 22 are installed in the module rail guides 50 disposed in the fiber optic equipment tray rails 82A, 82B. These fiber optic equipment tray rails 82A, 82B are configured to be disposed in the module rail guides 32A, 32B attached to the chassis 12 as illustrated in FIG. 2A such that the fiber optic equipment tray 20 is translatable with respect to the chassis 12.

Figure 7:
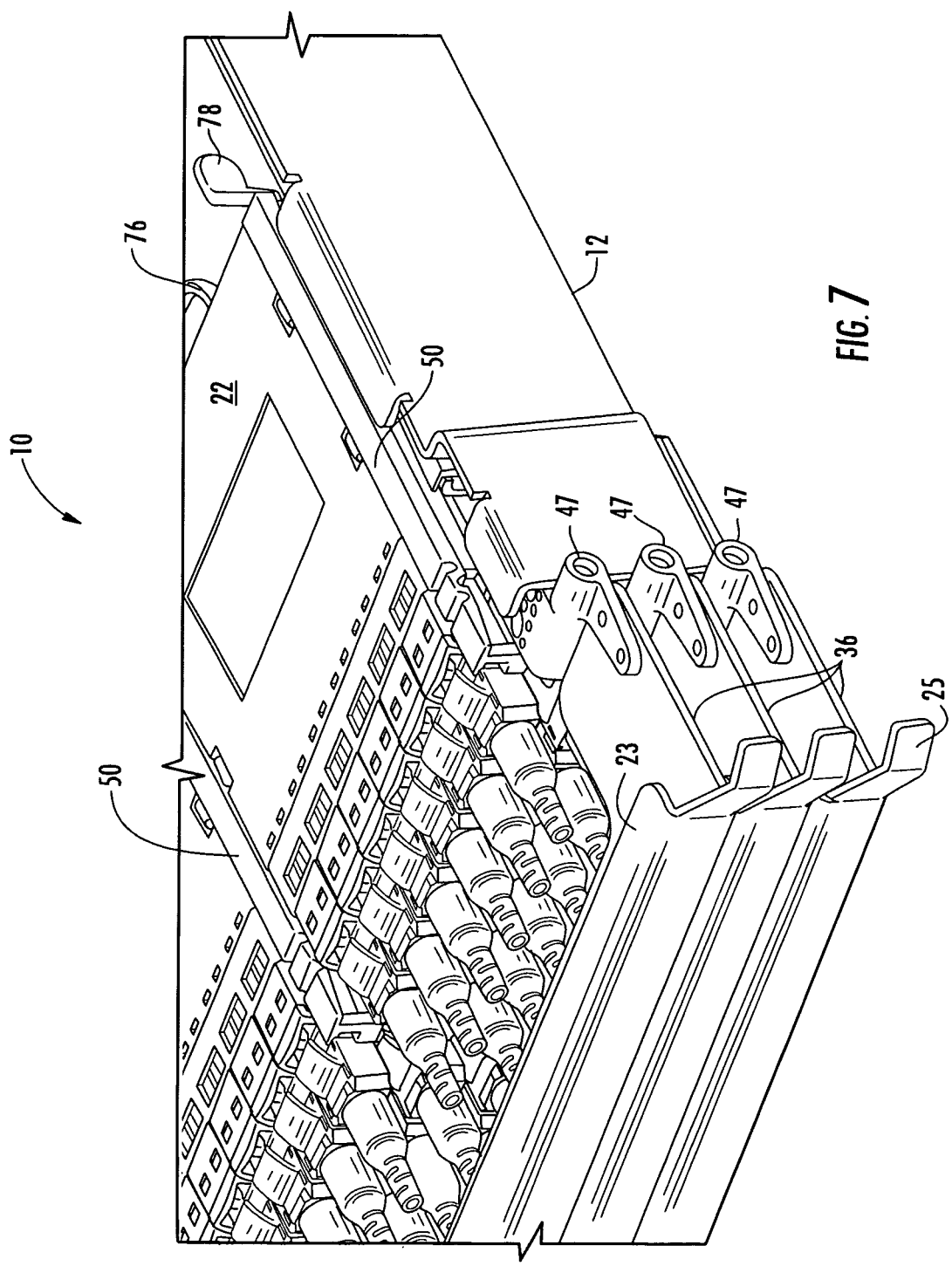
FIG. 7 is a front perspective close-up view of the fiber optic equipment tray of FIG. 3 with rear-installable fiber optic modules installed in the module guides.
Figure 8:
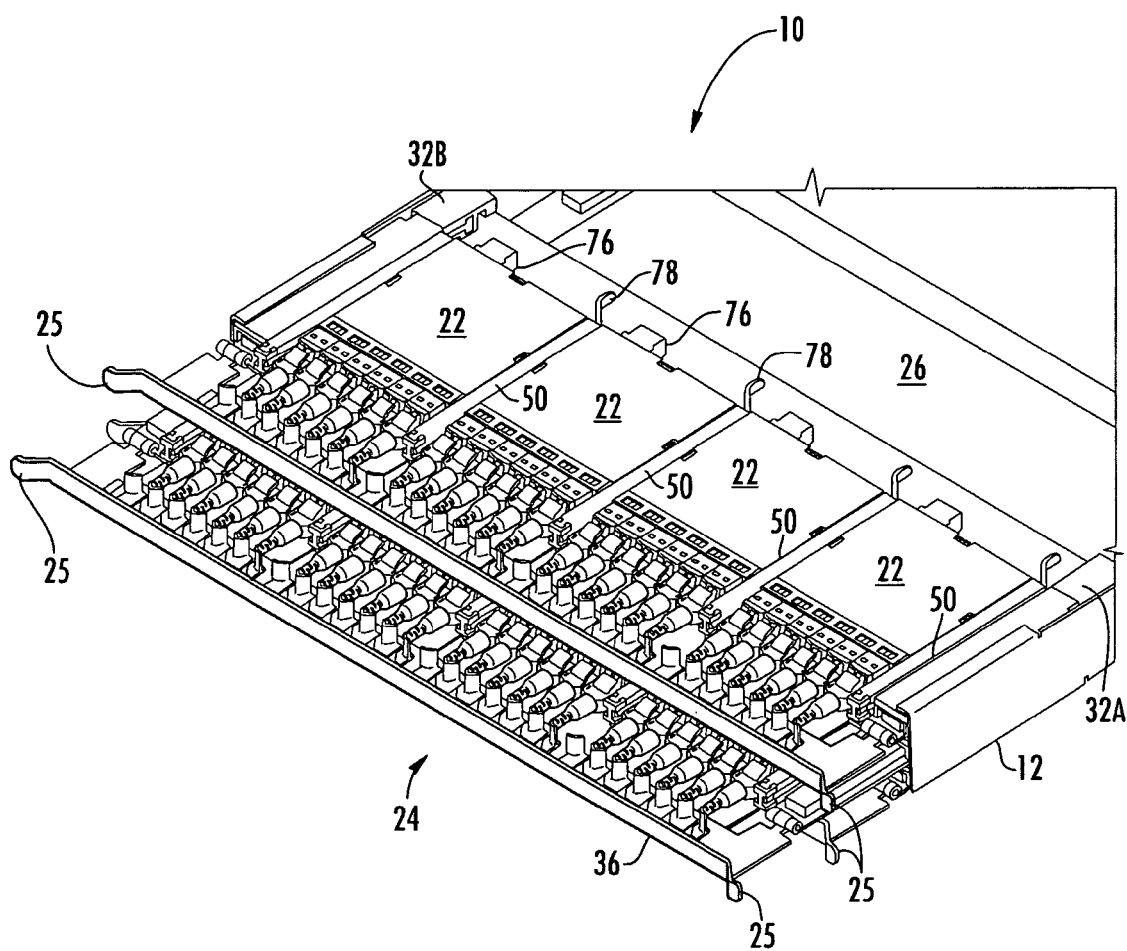
FIG. 8 is a front perspective view of a fiber optic equipment tray extended from the fiber optic equipment.
Figure 9:
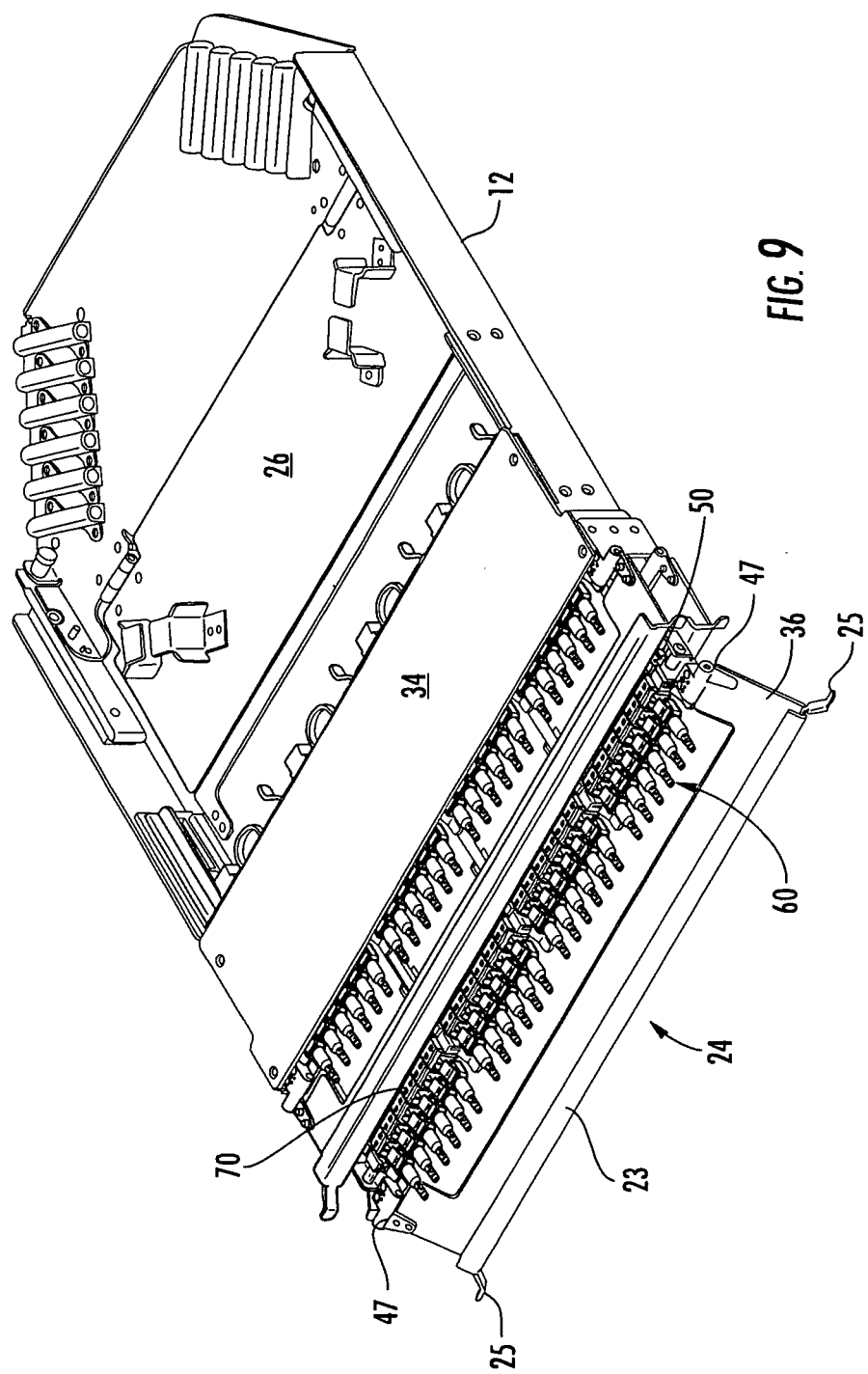
FIG. 9 is a front perspective view of a fiber routing guide tray of a fiber optic equipment tray lowered to obtain front access to the fiber optic modules supported in the fiber optic equipment tray.

FIG. 7 illustrates a front perspective view of the fiber optic equipment tray 20 in FIG. 6 in more detail. As illustrated therein, three (3) fiber optic equipment trays 20 are disposed within the tray rail guides 32A, 32B of the chassis 12. As illustrated therein, the hinges 46A, 46B that hingedly attach the fiber routing tray 36 to the fiber optic equipment trays 20 are provided in the form of position hinges 47. The position hinges 47 are configured to engage with the module rail guides 50 such that the fiber optic module 22 cannot be extended forward when the position hinges 47 are engaged. If it is desired to access the fiber optic module 22, the pulling tab 25 attached to the fiber routing tray 36 can be pulled forward to cause the fiber optic equipment tray 20 to extend forward from the front end 24 of the chassis 12 as illustrated in FIG. 8. Thereafter, the fiber routing tray 36 can be tilted downward as illustrated in FIG. 9. When the fiber optic equipment tray 20 and its fiber routing tray 36 are tilted downward, the position hinges 47 on each side of the fiber optic equipment tray 20 are disengaged with the module rail guides 50 for that particular fiber optic equipment tray 20 such that the fiber optic modules 22 supported by that fiber optic equipment tray 20 can be removed from the front end 24 of the chassis 12. Also, by allowing the fiber routing tray 36 to be tilted downward, unobstructed access can be obtained to the fiber optic module adapter 70 and fiber optic connectors 68 for establishing or disconnecting fiber optic connections.

Figure 10:
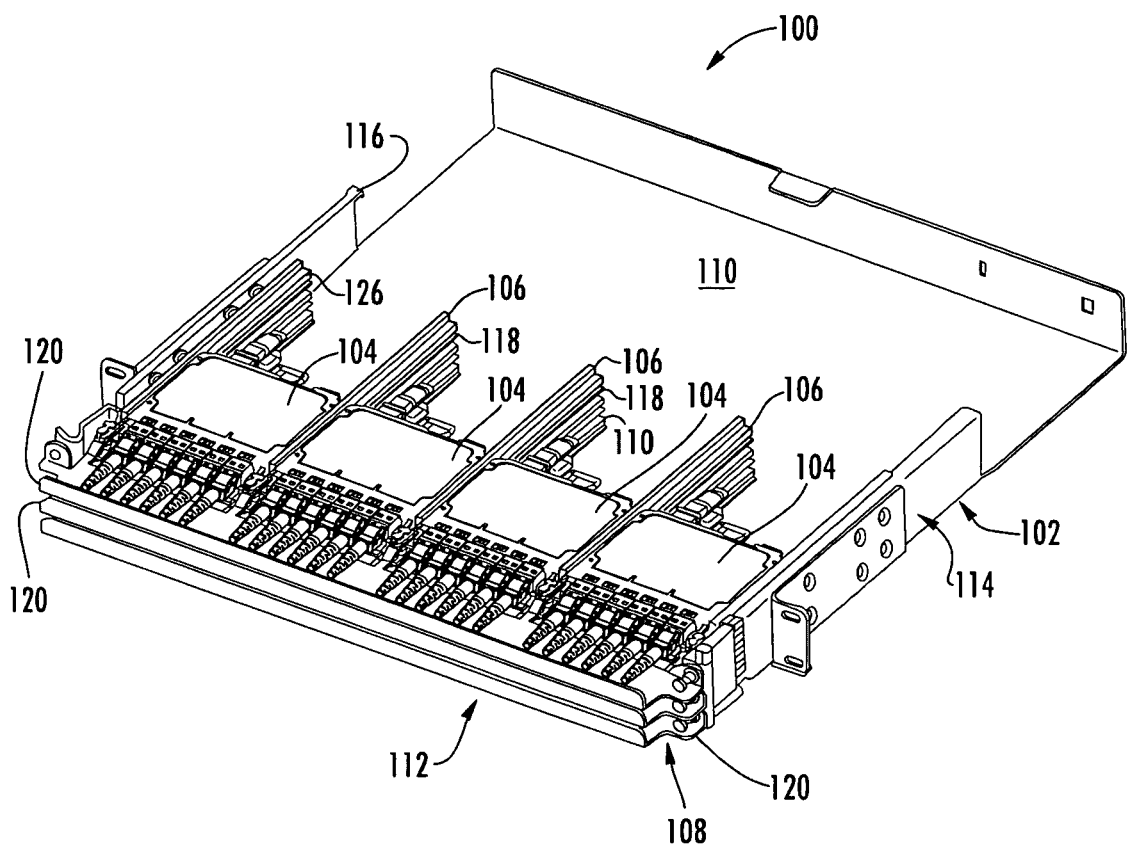
FIG. 10 is a front perspective view of another exemplary fiber optic equipment supporting rear-installable fiber optic modules disposed in module guides.

A plurality of fiber optic modules can also be disposed in a module guide system in the fiber optic equipment without need or requirement for an intermediate fiber optic equipment tray. In this manner, each of the fiber optic modules translate independently of other fiber optic modules disposed within the module guide system. In this regard, FIG. 10 illustrates another embodiment of fiber optic equipment 100. Fiber optic equipment 100 includes a module guide system disposed in a chassis 102 that supports rear-installable fiber optic modules. As will be described later in this application, the fiber optic equipment 100 provides an alternative guide system for rear-installable fiber optic modules. In FIG. 10, fiber optic modules 104 are supported within module rail guides 106 disposed in a chassis 102 of the fiber optic equipment 100. This is opposed to the fiber optic equipment 10 in FIGS. 1-9, wherein fiber optic modules are disposed in intermediate fiber optic equipment trays attached to a chassis. In this manner and as illustrated in FIG. 10, the fiber optic equipment 100 allows fiber optic modules 104 to be inserted into module rail guides 106 disposed in the chassis 102 and independently translated about the module rail guides 106.

Turning to FIG. 10, a plurality of rear installable fiber optic modules 104 are installed in the fiber optic equipment 100. The fiber optic modules 104 are supported by a plurality of module rail guides 106. Unlike the fiber optic equipment 10 of FIG. 1, the module rail guides 106 are attached directly to the chassis 102. Fiber optic equipment trays 108 are still provided to support the forward translation of the fiber optic modules 104 from the fiber optic equipment 100. As will be described later in this application, when the fiber optic modules 104 are installed from a rear section 110 of the chassis 102 into the module rail guides 106. The fiber optic modules 104 can then be moved forward within the module rail guides 106 to a front end 112 of the chassis 102. The fiber optic modules 104 will then engage with a latch (not shown) that will then attach the fiber optic modules 104 to fiber optic equipment trays 108. In this manner, when the fiber optic equipment tray 108 is pulled forward from the chassis 102, the fiber optic module 104 will also move outward with the fiber optic equipment tray 108 due to the interlock between the fiber optic modules 104 and the fiber optic equipment tray 108, although is still supported by the module rail guides 106. Thus, in the fiber optic equipment 100 in FIG. 10, the fiber optic equipment trays 108 are independently movable with respect to the chassis 102; however, the fiber optic modules 104 are not independently movable within the fiber optic equipment tray 108 like provided in the fiber optic equipment 10 of FIG. 1.

The chassis 102 also comprises a first end 114 and a second end 116, wherein the second end 116 is disposed on the opposite side from the first end 114. A plurality of module rail guides 106 are disposed within the chassis 102 between the first end 114 and the second end 116. A minimum of two (2) module rail guides 106 are required to support at least one (1) fiber optic module 104. However, as illustrated in FIG. 10, five (5) module rail guides 106 are provided to support four (4) fiber optic modules 104 per level. As will be described later in this application in more detail, the module rail guides 106 can contain a plurality of channels 118 to support more than one level or plane of fiber optic modules 104. In the example of the fiber optic equipment 100 in FIG. 10, three (3) levels of fiber optic modules 104 are provided; thus, three (3) channels 118 are provided in each module rail guide 106. The fiber optic equipment trays 108 each contain a routing tray 120 that can be pulled in order to remove a fiber optic equipment tray 108 from the chassis 102.

Figure 11:
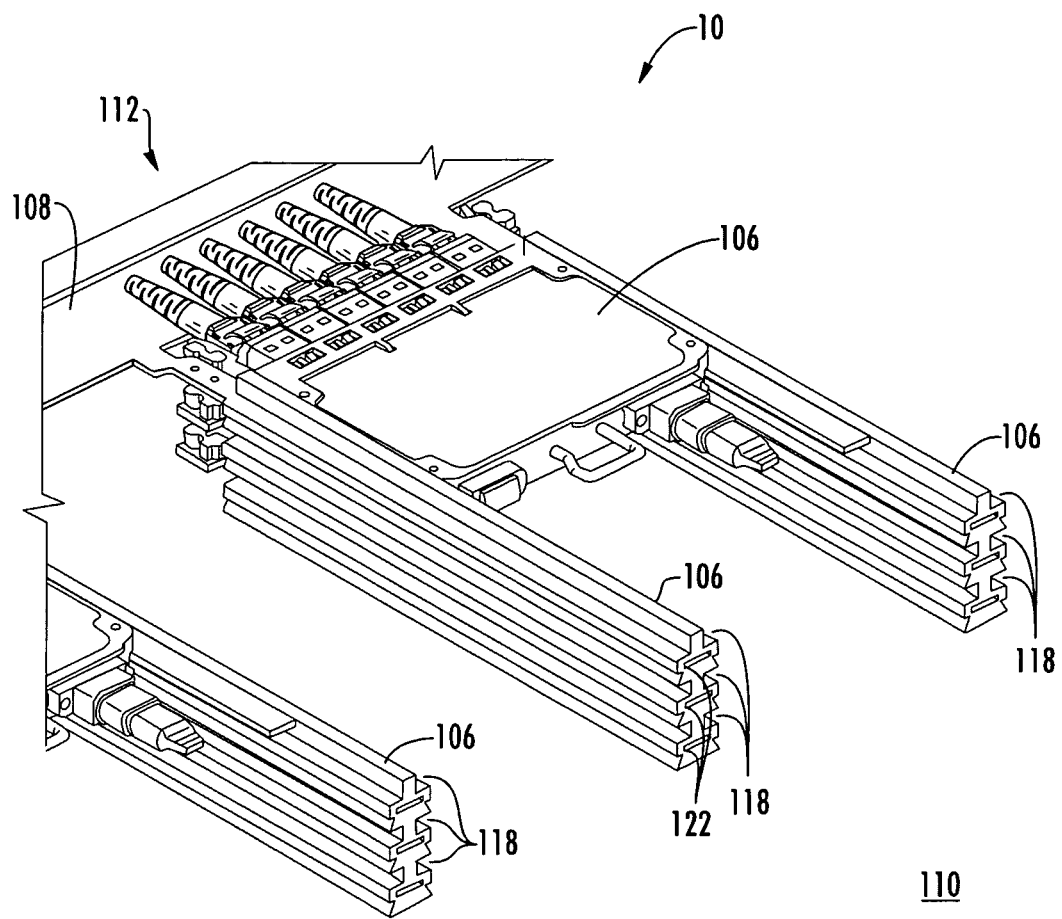
FIG. 11 is a rear perspective view of the fiber optic equipment supporting the rear-installable fiber optic modules of FIG. 10.

FIG. 11 illustrates a rear perspective view of the module rail guides 106 disposed within the chassis 102 and how the fiber optic module 104 is installed from the rear section 110 of the chassis 102. Further, FIG. 11 illustrates how the fiber optic equipment trays 108 are also supported by the module rail guides 106 and how the fiber optic modules 104 attach to the fiber optic equipment trays 108 when pulled forward. As illustrated in FIG. 11, the module rail guides 106 are provided wherein a fiber optic module 104 can be inserted from the rear section 110 into the channels 118. The fiber optic module 104 can then be pushed forward with the module rail guides 106 towards the front end 112 of the chassis 102. The module rail guides 106 also contain a series of tray guides 122 disposed in the plane substantially orthogonal to the channels 118 to receive fiber optic equipment trays 108, although any orientation is possible.

Figure 12:
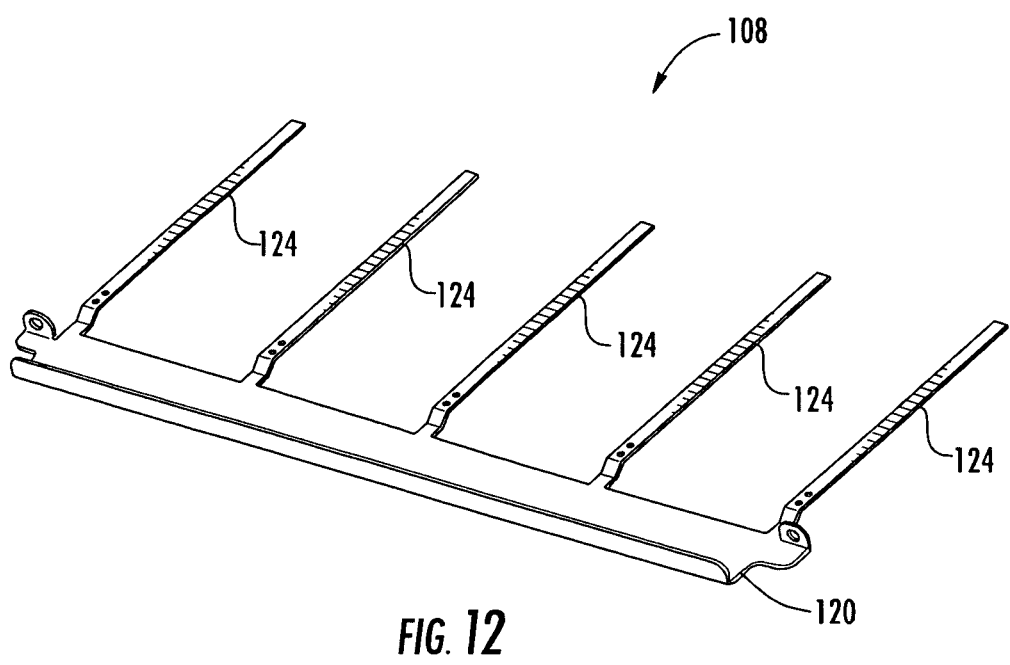
FIG. 12 is a front perspective view of an individual fiber optic equipment tray in the fiber optic equipment of FIG. 10.
Figure 13:
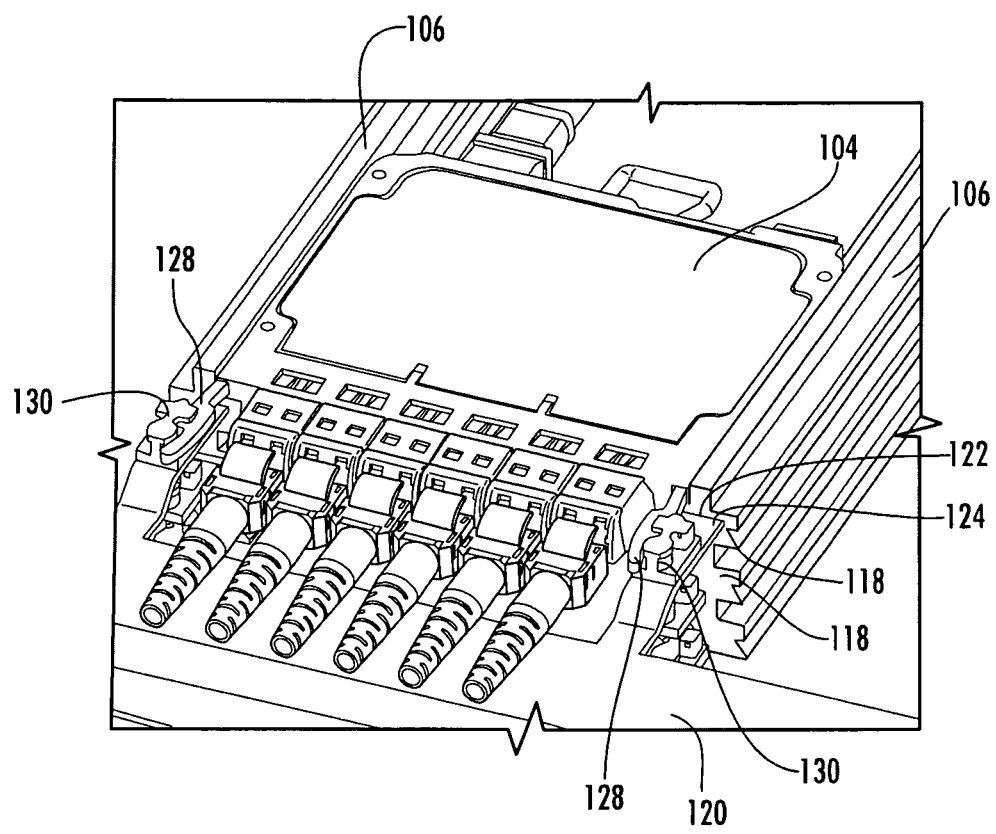
FIG. 13 is a rear perspective view of the rear-installable fiber optic module installed in the module guides disposed in the fiber optic equipment of FIG. 10.
Figure 14:
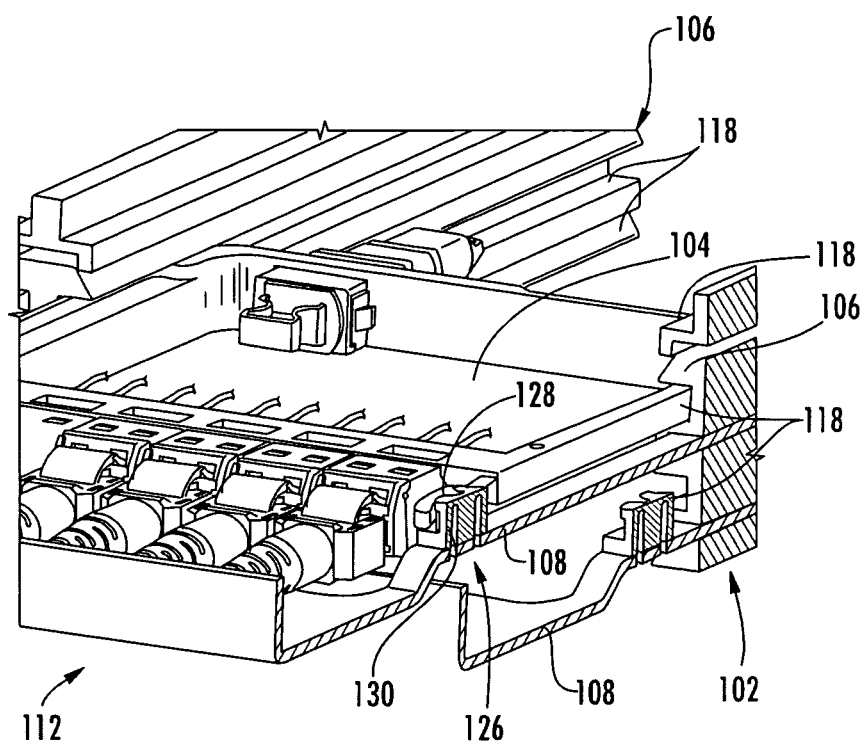
FIG. 14 is a rear perspective close-up view of the rear-installable fiber optic module disposed within module guides in the fiber optic equipment of FIG. 10 and locked into the fiber optic equipment tray of FIG. 12 when the fiber optic module is pulled forward.
Figure 15:
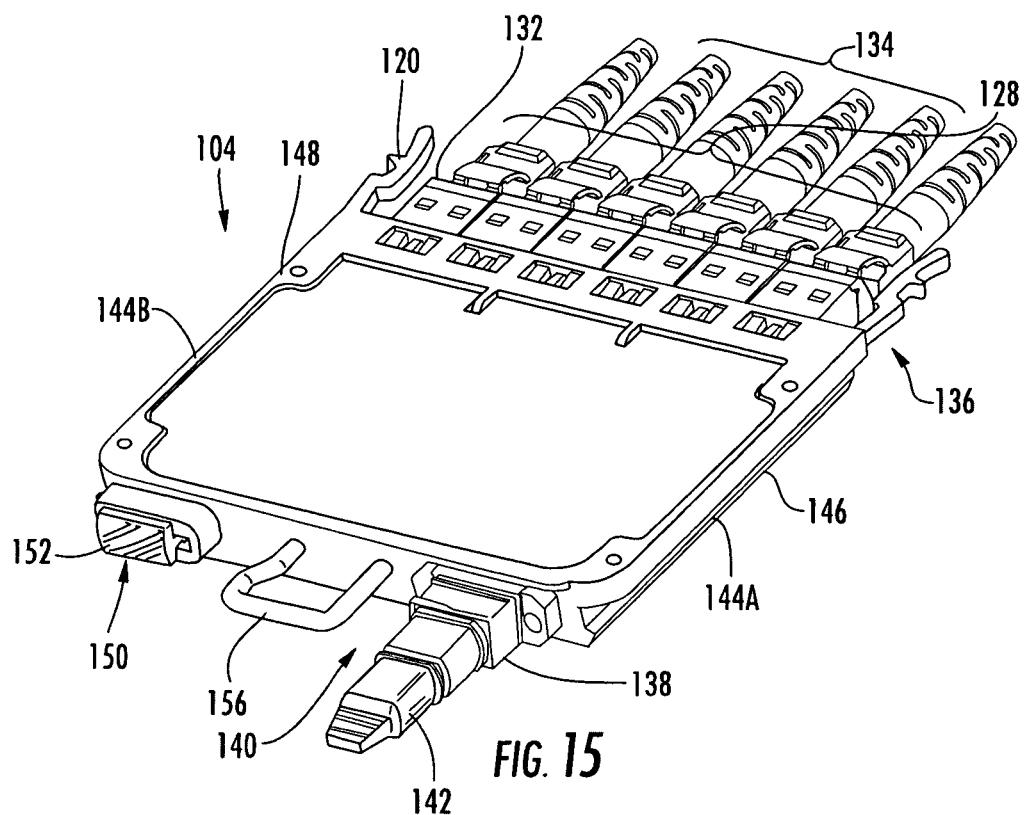
FIG. 15 is a rear perspective view of the fiber optic module in FIG. 14.

As illustrated in FIG. 12, the fiber optic equipment tray 108 contains a series of elongated sections 124. The elongated sections 124 are configured to be inserted into the tray guides 122 disposed inside the module rail guides 106 along the longitudinal axis of the channels 118. Thus, as illustrated in FIGS. 13 and 14, when the fiber optic module 104 is pulled all the way forward along the module rail guide 106 to a front portion 126 of the fiber optic equipment tray 108, a locking feature in the form of a front module latch 128 interlocks with a detent feature 130 disposed adjacent the front end 112 of the chassis 102. The detent feature 130 is secured to the fiber optic equipment tray 108. In this manner, the fiber optic module 104 becomes interlocked with the fiber optic equipment tray 108 such that when the fiber optic equipment tray 108 is translated forward on the first end 114 of the chassis 102, the fiber optic module 104 travels forward with the fiber optic equipment tray 108. The elongated sections 124 and the fiber optic modules 104 interlocked with the fiber optic equipment tray 108 translate together about the tray guides 122 even though the fiber optic module 104 is still supported by the module rail guides 106. FIG. 15 illustrates the fiber optic module 104 and more detail regarding the front module latch 128 in particular.

As illustrated in FIG. 15, the fiber optic module 104 is comprised of a plurality of fiber optic adapters 132 configured to support fiber optic connectors 134 on a front end 136 of the fiber optic module 104. A fiber optic adapter 138 is disposed on a rear end 140 of the fiber optic module 104. In this example of the fiber optic module 104 of FIG. 15, the fiber optic adapters 132 are duplex LC fiber optic adapters, and the fiber optic adapter 138 disposed in the rear end 140 of the fiber optic module 104 is an MTP fiber optic adapter, although any fiber connection type is possible. Fiber optic connections are established between the fiber optic connectors 134 and an MTP fiber optic connector 142 connected to the MTP fiber optic adapter 138. Optical fibers establishing connections between the fiber optic adapters 132, 138 are provided inside the fiber optic module 104.

The fiber optic module 104 also contains two (2) module rails 144A, 144B on a first side 146 and a second side 148, respectively, of the fiber optic module 104. The module rails 144A, 144B are configured to be inserted into the channels 118 of the module rail guides 106 such that the fiber optic module 104 can be translated within the module rail guides 106. In this regard, because the channels 118 in the module rail guides 106 are open in the rear section 110, as illustrated in FIG. 11, the fiber optic modules 104 are rear-installable into the fiber optic equipment 100. The fiber optic module 104 can then be translated forward within the channels 118 until the front module latch 128 reaches the detent feature 130. The front module latch 128 is biased inward such that when it reaches the detent feature 130, the front module latch 128 flexes inward and is retained in the detent feature 130. Once the front module latch 128 is retained in the detent feature 130, the fiber optic module 104 cannot be pulled back towards the rear section 110 or towards the front end 112 independent of the fiber optic equipment tray 108 unless the front module latch 128 is released from the detent features 130. In this manner, the front module latch 128 releasably retains the fiber optic module 104.

Figures 16A, 16B:
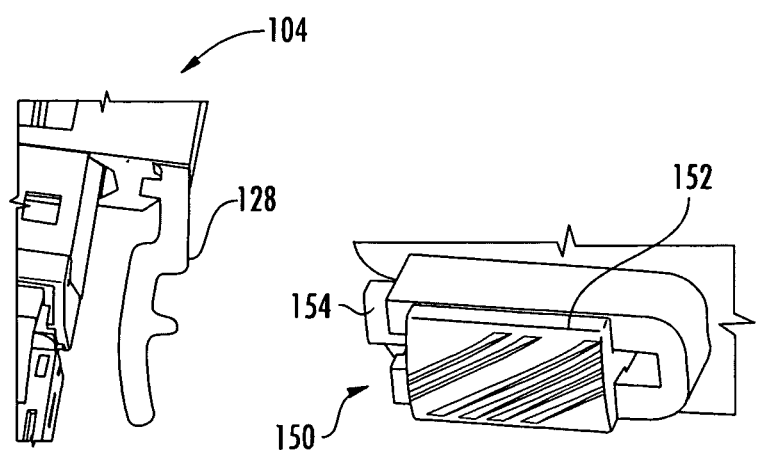
FIG. 16A is a perspective close-up view of a front locking latch in the fiber optic module of FIG. 15.
FIG. 16B is a perspective close-up view of a rear lock in the fiber optic module of FIG. 15.

FIG. 16A illustrates the front module latch 128 for the fiber optic module 104 in more detail. FIG. 16B illustrates a locking feature in the form of a rear module lock 150 that may be provided in the rear end 140 of the fiber optic module 104 to lock the fiber optic module 104 within the module rail guides 106. In this manner, the fiber optic module 104 cannot be removed towards the rear section 110 of the fiber optic equipment 100 unless the rear module lock 150 is unlocked by pushing a rear module lock button 152 to the right as illustrated. When the rear module lock button 152 is moved to the right as illustrated, a latch 154 is disengaged from the channel 118 of the module rail guide 106 such that the fiber optic module 104 can be removed from the rear section 110. The fiber optic module 104 may be removed from the rear section 110 by pulling on a pulling loop 156 (as shown in FIG. 15) attached to the rear end 140 of the fiber optic module 104.

Figure 17:
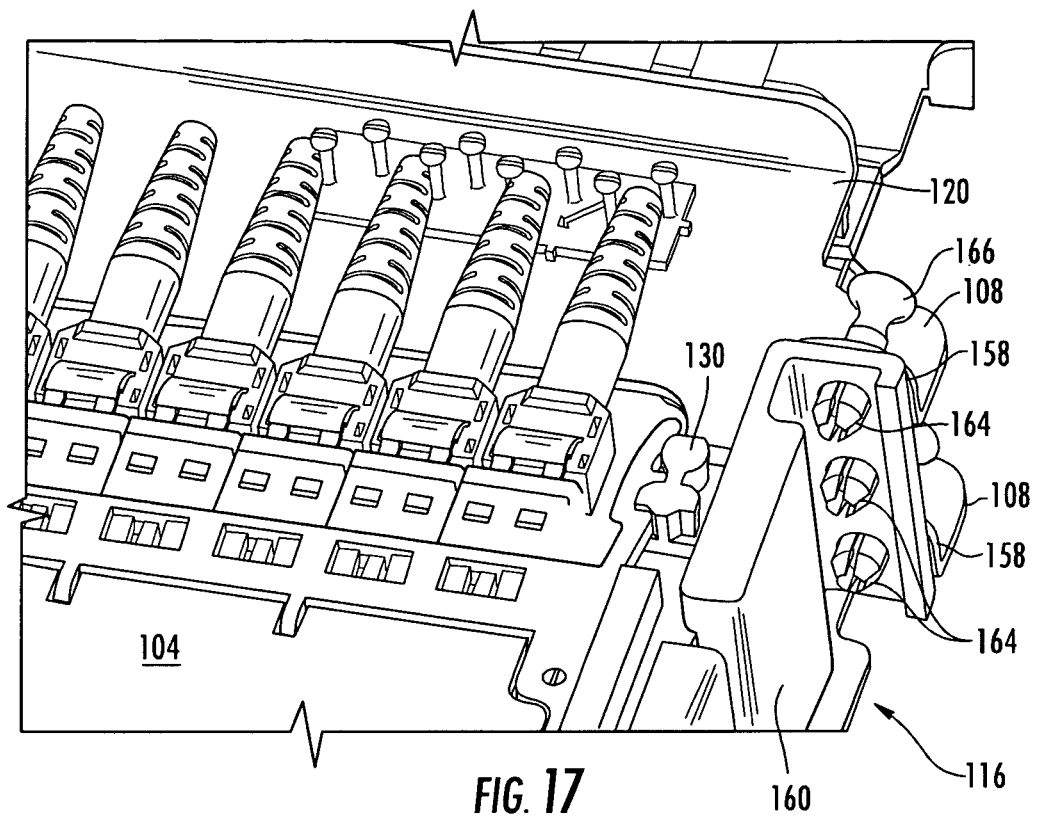
FIG. 17 is a rear perspective close-up view of the rear-installable fiber optic modules installed in module guides.
Figure 18:
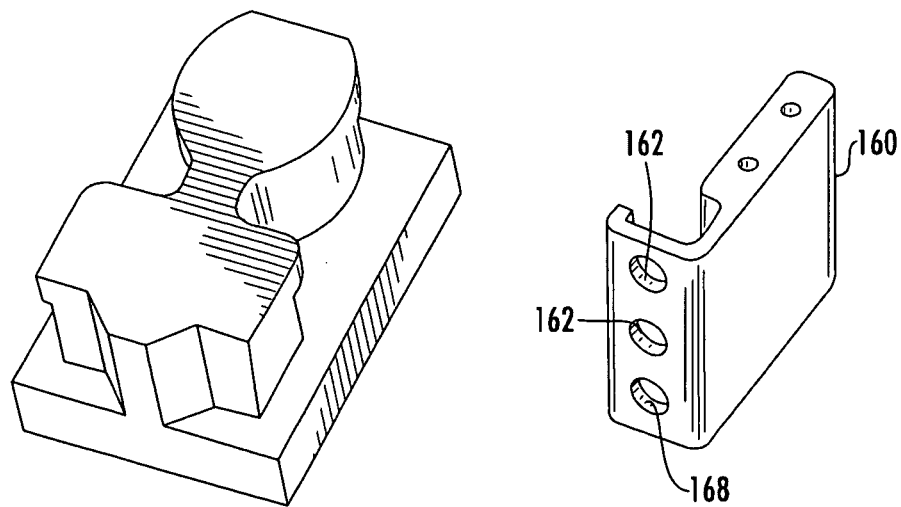
FIG. 18 is a perspective view of the locking features to lock fiber optic modules to fiber optic equipment tray and the fiber optic equipment trays to the chassis of the fiber optic equipment of FIG. 10.

FIGS. 17 and 18 illustrate the detent feature 130 and how the fiber optic equipment trays 108 are interlocked into the chassis 102. As illustrated therein, the fiber optic equipment tray 108 contains an upwardly extending tab 158 that is secured to a bracket 160 wherein the bracket 160 is attached to the chassis 102. The bracket 160 contains a series of apertures 162 that are adapted to receive flanges 164 from plungers 166. Each fiber optic equipment tray 108 contains a plunger 166 disposed through the upwardly extending tab 158 that is adapted to engage with the aperture 162. When it is desired to lock the fiber optic equipment tray 108 to the chassis 102, the plunger 166 is engaged in the aperture 162. As illustrated in FIGS. 17 and 18, three (3) apertures 162 are provided in the bracket 160 because three (3) fiber optic equipment trays 108 are provided. Each aperture 162 is designed to retain the upwardly extending tab 158 from a particular fiber optic equipment tray 108. FIG. 17 illustrates the bracket 160 disposed on the second end 116 of the chassis 102. Although not shown, the bracket 160 is also disposed on the first end 114 of the chassis 102 as illustrated in FIG. 10. When it is desired to release the fiber optic equipment tray 108 from the chassis 102, such as to pull it forward for access, the plunger 166 is pulled and disengaged from the corresponding aperture 162 in the bracket 160. In this manner, each fiber optic equipment tray 108 is free to independently translate outwardly towards the front end 112 wherein the elongated sections 124 are moved forward about the tray guides 122 within the module rail guides 106.

Figure 19:
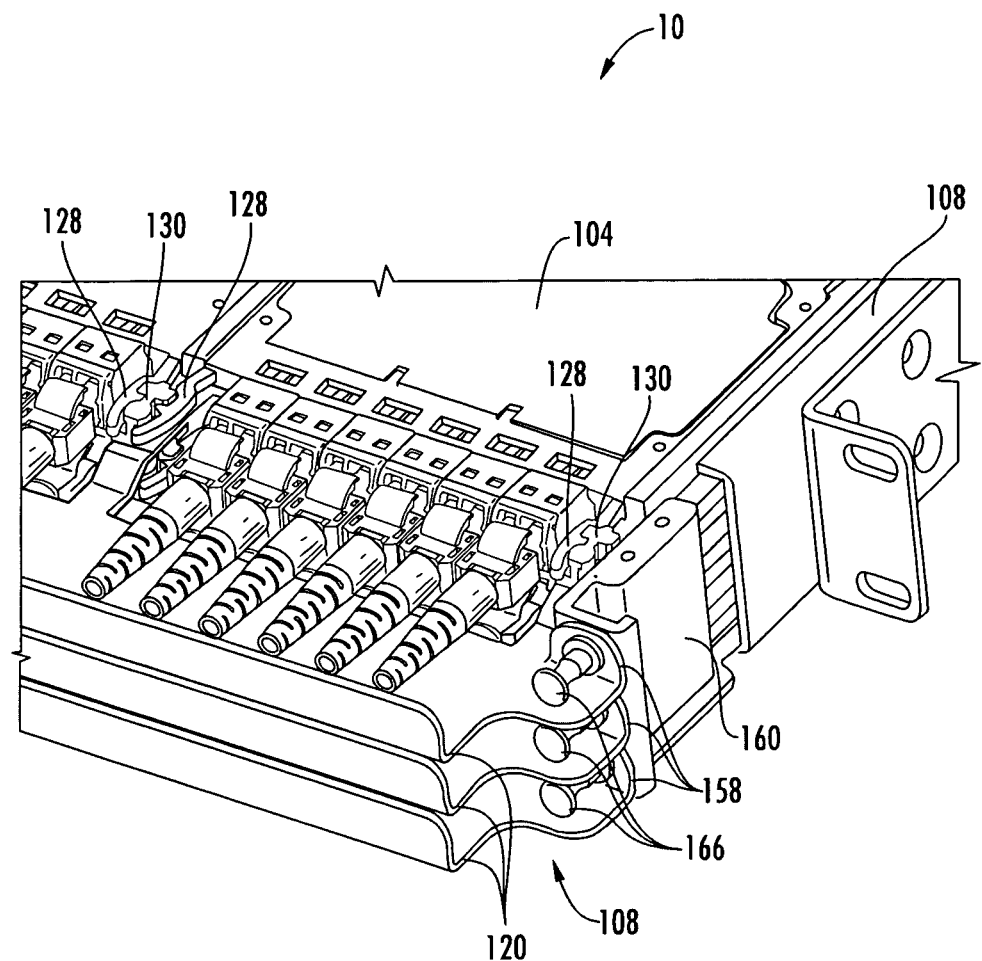
FIG. 19 is a front perspective view of the fiber optic equipment of FIG. 10 with rear-installable fiber optic modules disposed in the module guides.
Figure 20:
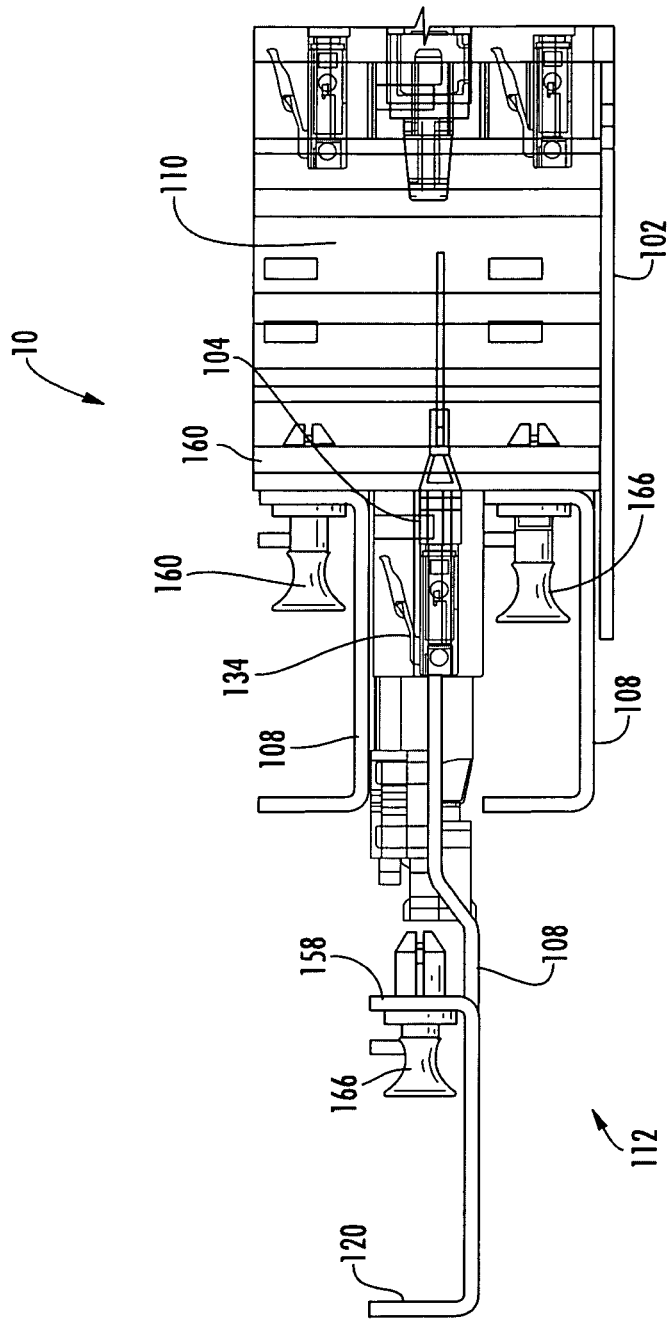
FIG. 20 is a side cross-sectional view of the fiber optic equipment of FIG. 10 with rear-installable fiber optic modules disposed in the module guides and interlocked with the fiber optic equipment trays, with one fiber optic equipment tray extended forward.
Figure 21:
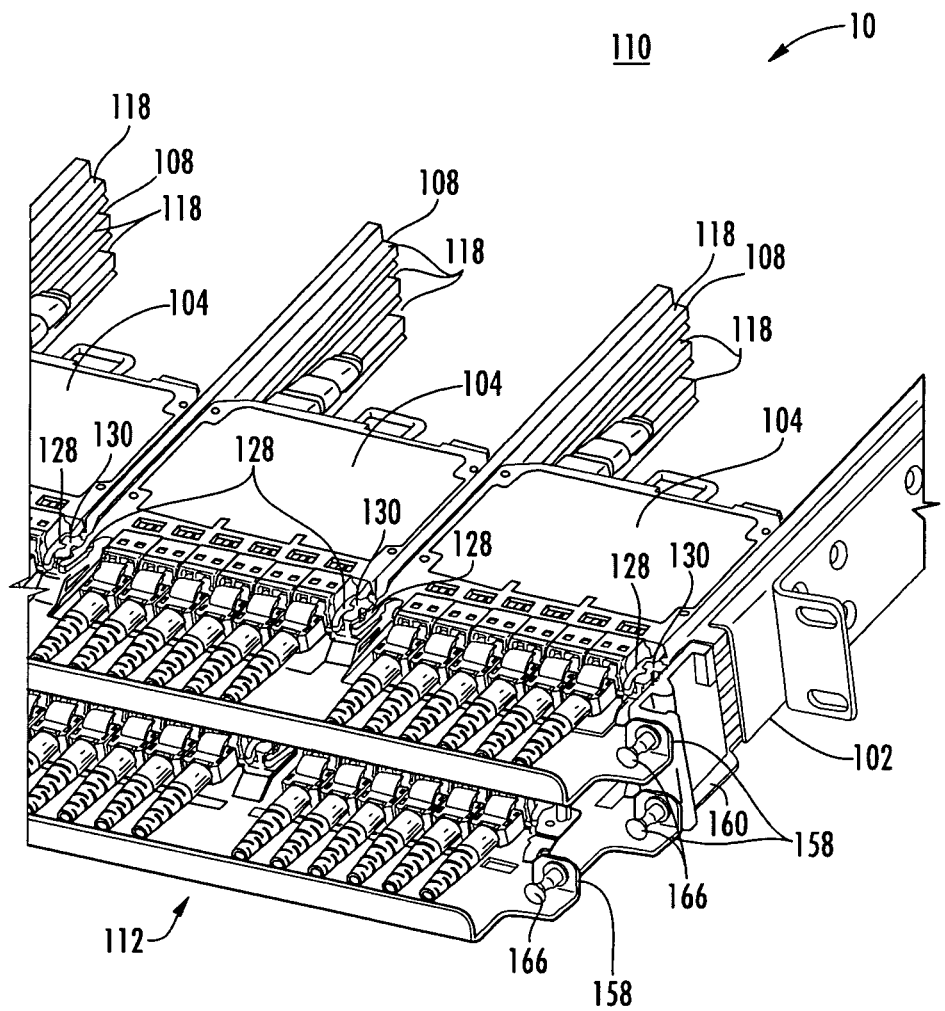
FIG. 21 is a front perspective view of the fiber optic equipment of FIG. 20.

FIG. 19 illustrates a front perspective view of the fiber optic equipment 100 and the fiber optic modules 104 locked into the fiber optic equipment trays 108 via the front module latch 128 engaging with the detent feature 130. As illustrated therein, each of the fiber optic equipment trays 108 are secured to the chassis 102 via their plungers 166 being engaged with the bracket 160. In order to disengage the fiber optic equipment tray 108 from the chassis 102, the plunger 166 is pulled to disengage the plunger 166 from the aperture 162 in the bracket 160. In this manner, the pulling force applied towards the front end 112 will translate the fiber optic equipment tray 108 forward. This is illustrated in FIGS. 20 and 21. FIG. 20 is a side cross-sectional view of the fiber optic equipment 100 shown in perspective view in FIG. 21 with a middle fiber optic equipment tray 108 extended. As illustrated therein, the middle fiber optic equipment tray 108 is extended from the chassis 102. The plunger 166 for the middle fiber optic equipment tray 108 is disengaged from the bracket 160 and the aperture 162 therein.

Figure 22:
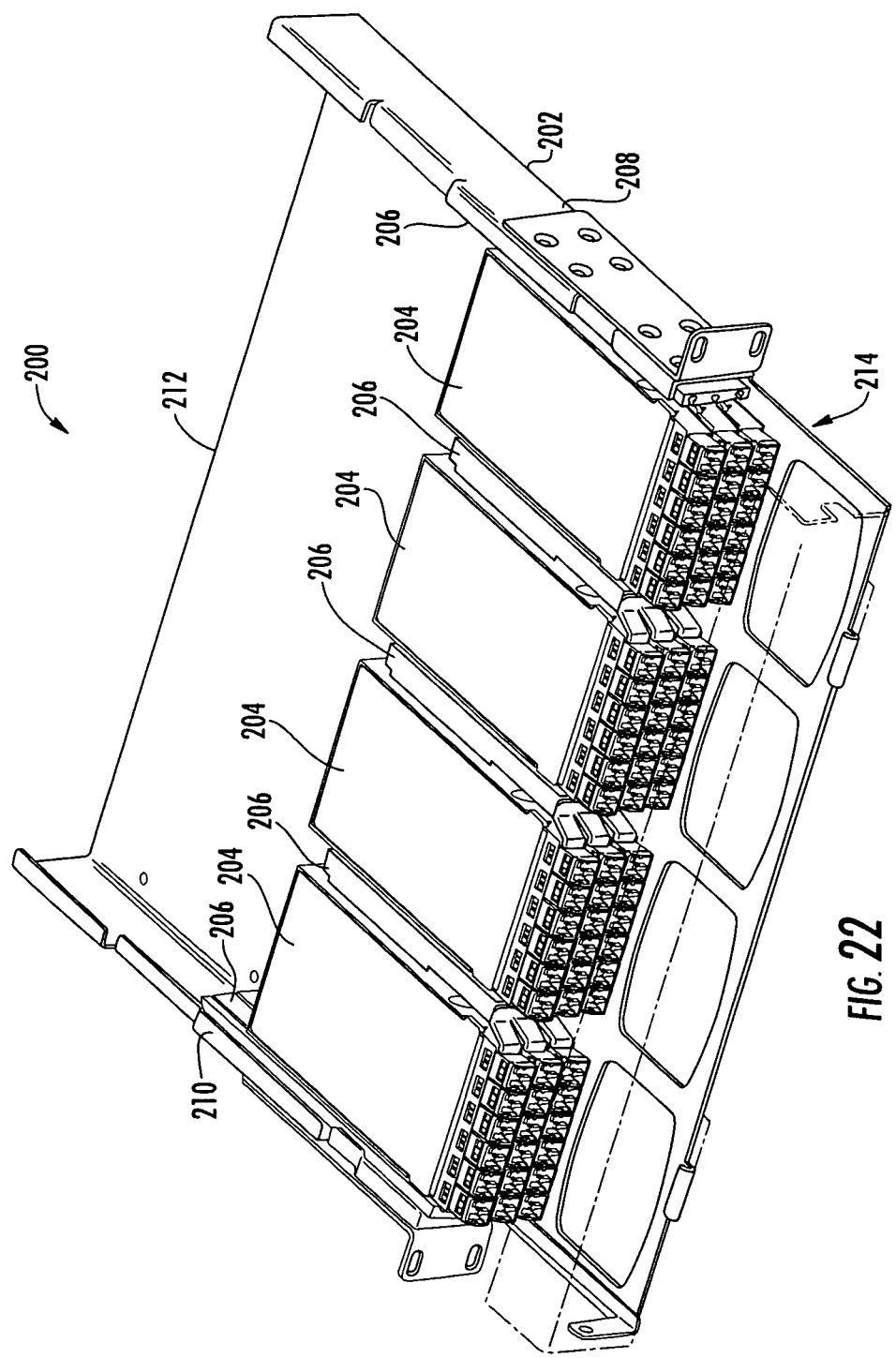
FIG. 22 is a front perspective view of another exemplary fiber optic equipment supporting rear-installable fiber optic modules.

FIG. 22 illustrates yet another example of fiber optic equipment 200 that also provides for rear-installable fiber optic modules. Like the fiber optic equipment 100 in FIGS. 10-21, each fiber optic module supported in the fiber optic equipment 200 of FIG. 22 is supported in module rails disposed in the chassis. The fiber optic modules are also independently translatable within the module rails.

As illustrated in FIG. 22, the fiber optic equipment 200 is provided, which includes a chassis 202 configured to hold one or more fiber optic modules 204. The fiber optic modules 204 are supported on a guide system in the form of module rail guides 206 that are disposed within and attached to the chassis 202 similar to the fiber optic equipment 100 in FIGS. 10-21. The module rail guides 206 are attached to the chassis 202. Only two module rail guides 206 are required to be provided on a first end 208 of the chassis 202 and a second end 210 of the chassis 202 such that a fiber optic module 204 can be installed in a rear section 212 of the chassis 202 and moved along the module rail guides 206 to a front end 214 of the chassis 202.

As will be described in further detail in this application, the module rail guides 206 contain one or more channels 216 (shown in FIGS. 24A and 24B) that are adapted to receive rails (element 215 in FIG. 25) disposed on each side of the fiber optic modules 204. The channels 216 are open in the rear section 212 such that the rails of the fiber optic module 204 can be inserted into the module rail guides 206 in the rear section 212 of the chassis 202 and moved forward within the module rail guides 206 until the fiber optic module 204 reaches the front end 214 of the chassis 202. This is further illustrated in FIG. 23. As illustrated therein, a fiber optic module 204 is shown as being inserted partially into the module rail guides 206. Module rails 215A, 215B are disposed on each side of the fiber optic module 204 such that the module rails 215A, 215B mate with the channels 216 in the module rail guides 206 so that the fiber optic module 204 may be slid from the rear section 212 to the front end 214 of the chassis 202.

Figure 23:
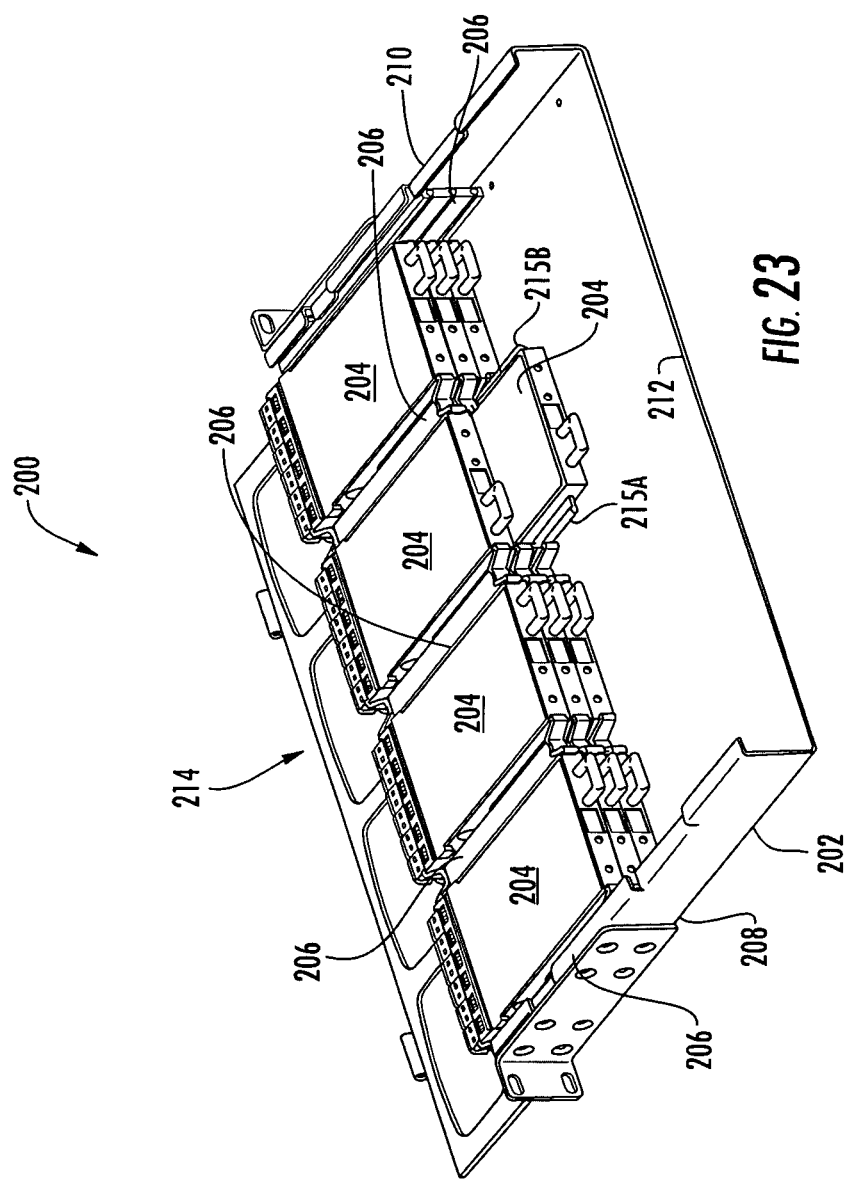
FIG. 23 is a rear perspective view of the fiber optic equipment supporting the rear-installable fiber optic modules of FIG. 22.
Figure 24A:
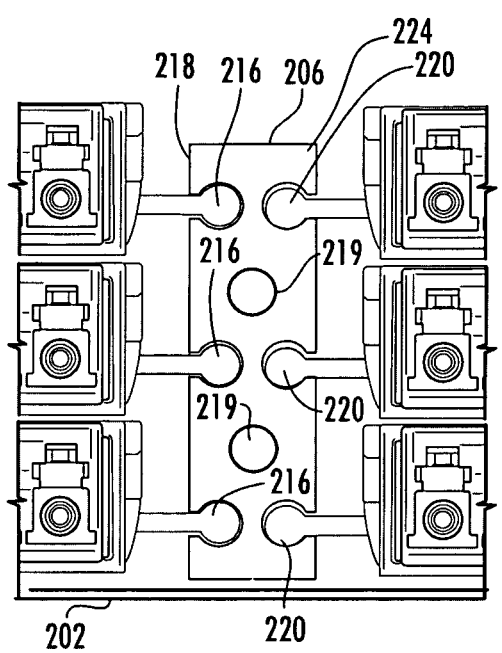
FIG. 24A is a front view of a module guide supporting rear-installable fiber optic modules in the fiber optic equipment of FIG. 22.
Figure 24B:
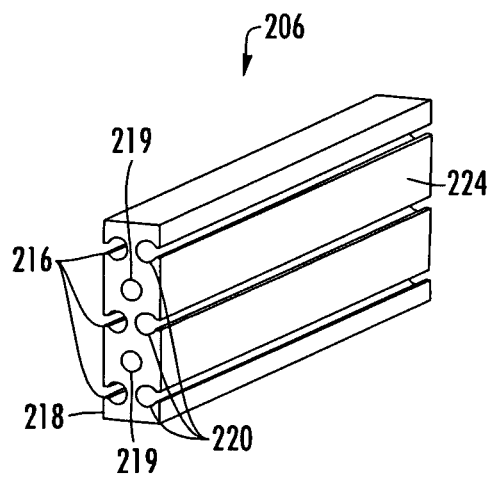
FIG. 24B is a perspective view of the module guide illustrated in FIG. 24A.

FIGS. 24A and 24B illustrate more detail regarding the module rail guides 206 that are disposed in the fiber optic equipment 200 of FIGS. 22 and 23. As illustrated therein, a module rail guide 206 is disclosed that is provided between the first end 208 and the second end 210. For this type of module rail guide 206, the channels 216 are disposed on a first side 218 of the module rail guides 206. Channels 220 are also provided on a second side 224 of the module rail guides 206.

In this manner, the module rail guide 206 can support rails of fiber optic modules 204 on each side. The module rail guide 206 illustrated in FIG. 24A would be provided as an intermediate module rail guide if more than one fiber optic module 204 in a given plane is supported by the fiber optic equipment 200. In this case, at least one intermediate module rail guide 206 is provided with channels 216, 220 disposed on each side 218, 224. As illustrated in FIG. 24A, the module rail guide 206 is attached to the chassis 202 such that when the module rails 215A, 215B of the fiber optic modules 204 are disposed within the channels 216, 220, the fiber optic modules 204 are supported by the chassis 202. Also, as will be described in greater detail below with regard to FIGS. 26A and 26B, the module rail guides 206 also contain a series of internal apertures 219 that support attaching module locks or stops to the chassis 202. The module locks or stops prevent the fiber optic modules 204 from translating beyond the front end 214 of the chassis 202.

Figure 25:
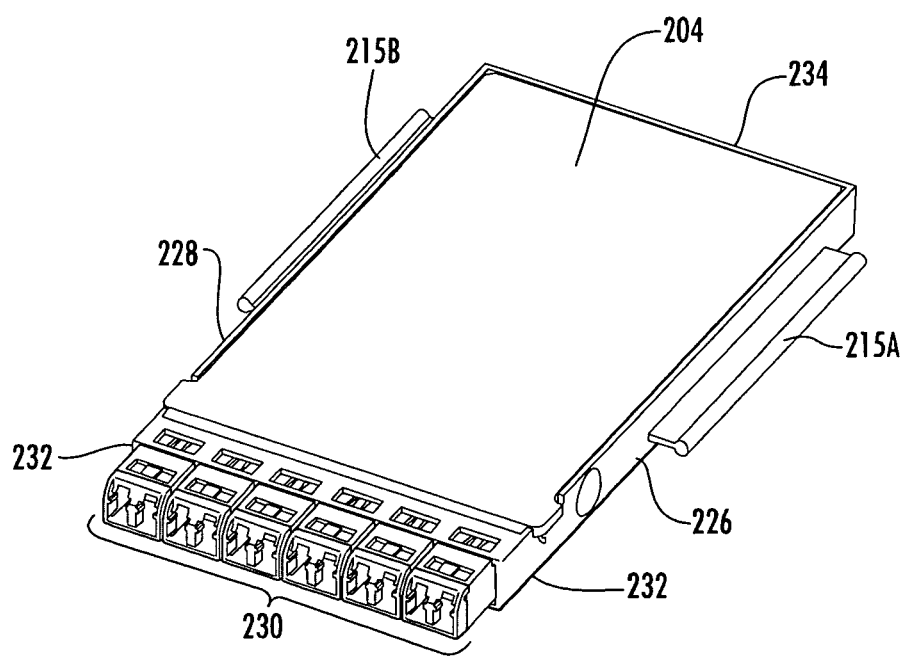
FIG. 25 is a front perspective view of the fiber optic modules disposed in the module guides provided in the fiber optic equipment of FIG. 22.

FIG. 25 illustrates the rear-installable fiber optic module 204 that is adapted to be supported by the module rail guides 206 of the fiber optic equipment 200. As illustrated therein, module rails 215A, 215B are disposed on sides 226, 228, respectively, of the fiber optic module 204. These module rails 215A, 215B can be inserted into the module rail guides 206 to insert the fiber optic module 204 into the fiber optic equipment 200. Because the channels 220 in the module rail guides 206 are open in the rear section 212 of the chassis 202, the fiber optic modules 204 are rear-installable, meaning they can be installed from the rear section 212 of the chassis 202. The fiber optic module 204 contains a series of fiber optic adapters 230 disposed on a front end 232 of the fiber optic module 204. One or more fiber optic adapters 230 optically connected to the fiber optic adapters 230 are disposed on a rear end 234 of the fiber optic module 204. In this manner, connectorized fiber optic cables (not shown) connected to the fiber optic adapters 230 establish a fiber optic connection with fiber optic cables (not shown) installed in the fiber optic adapters 230 in the rear end 234 of the fiber optic module 204.

FIG. 26A illustrates a front view of the fiber optic equipment 200 with fiber optic modules 204 installed in the module rail guides 206 as previously described. To prevent the fiber optic modules 204 from extending beyond the first end 208 of the chassis 202, stop or lock features 236 are disposed between the rows of fiber optic modules 204 on the intermediate module rail guides 206. FIG. 26B illustrates the stop or lock features 236 in more detail wherein front and rear perspective views are illustrated. The stop or lock features 236 contain a series of apertures 238 that align with the apertures 219 disposed in the module rail guides 206 as illustrated previously in FIG. 24B. A fastener (not shown) can be inserted into the apertures 238 to fasten the stop or lock features 236 to the module rail guides 206. The stop features 236 contain opposing flared portions 240 on each side of the stop or lock feature 236 which contain platforms 242 of which the front end 232 of the fiber optic modules 204 abut against to prevent the fiber optic modules 204 from extending forward from the first end 208 of the chassis 202.

Figure 27:
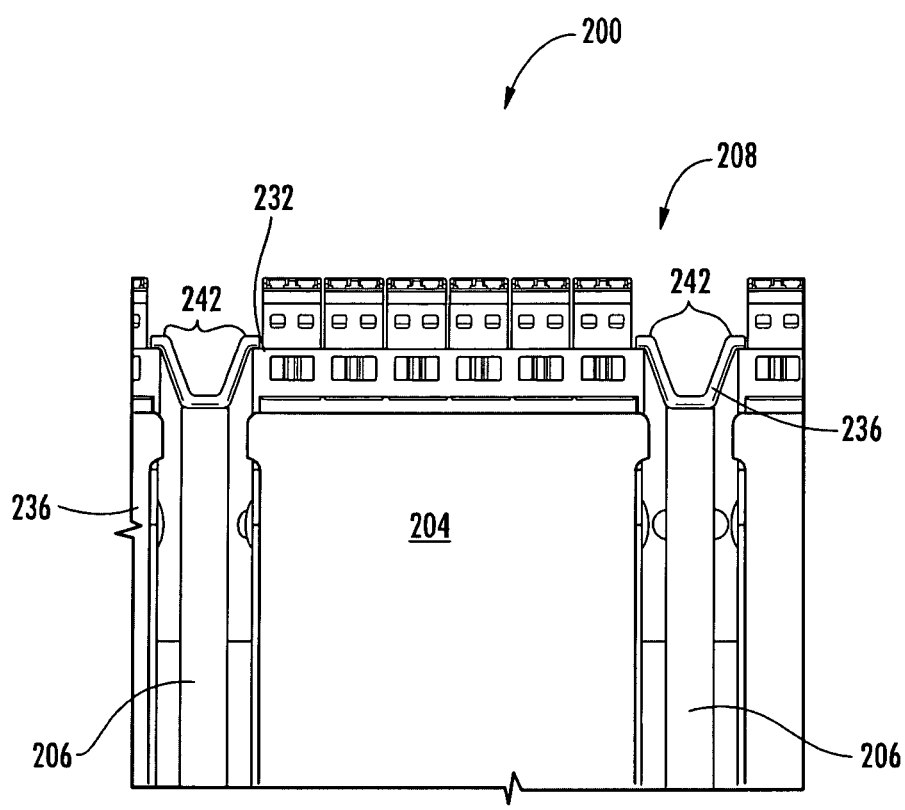
FIG. 27 is a top view of a fiber optic module supported by module guides disposed in the fiber optic equipment of FIG. 22.

FIG. 27 illustrates a top view of the fiber optic equipment 200 with the fiber optic module 204 installed therein between two module rail guides 206. As illustrated therein, the fiber optic module 204 is extended forward to the front end 214 of the chassis 202 wherein the front end 232 of the fiber optic module 204 abut against the platforms 242 in the stop or lock features 236 to prevent the fiber optic modules 204 from being extended beyond the front end 214 of the fiber optic equipment 200.

Figure 28:
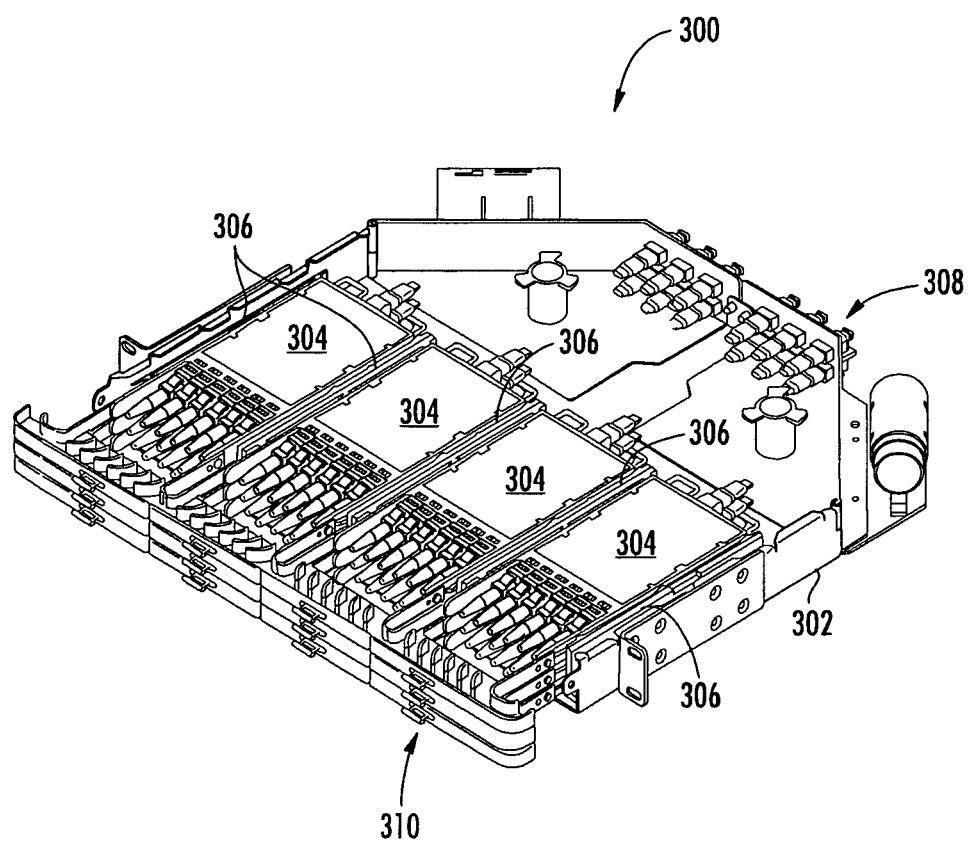
FIG. 28 is a front perspective view of another exemplary fiber optic equipment supporting rear-installable fiber optic modules.

FIG. 28 illustrates yet another embodiment of fiber optic equipment that is configured to allow and support rear-installable fiber optic modules. As illustrated in FIG. 28, the fiber optic equipment 300 contains a chassis 302 that supports one or more fiber optic modules 304. The fiber optic modules 304 are supported by a guide system in the form of module rail guides 306 that are attached to the chassis 302 such that each of the fiber optic modules 304 can translate about the module rail guides 306. More specifically, the fiber optic modules 304 can be rear-installable from a rear section 308 of the chassis 302 into the module rail guides 306 and extended forward within the module rail guides 306 to a front end 310 of the chassis 302.

Figure 29:
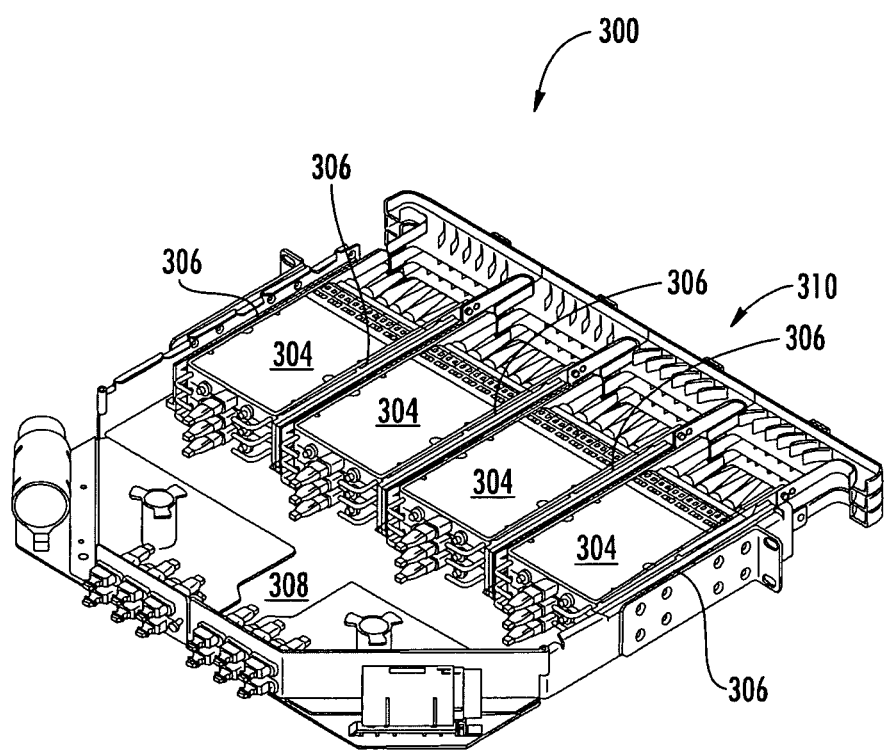
FIG. 29 is a rear perspective view of the fiber optic equipment supporting the rear-installable fiber optic modules of FIG. 28.

FIG. 29 illustrates a rear perspective view of the fiber optic equipment 300 illustrated in FIG. 28 showing a series of rear-installable fiber optic modules 304 installed therein. It is noted that the module rail guides 306 can be provided that support more than one plane or row of fiber optic modules 304. In such a case, a plurality of channels will be provided in the module rail guides 306 to support more than one row of fiber optic modules 304.

Figure 30:
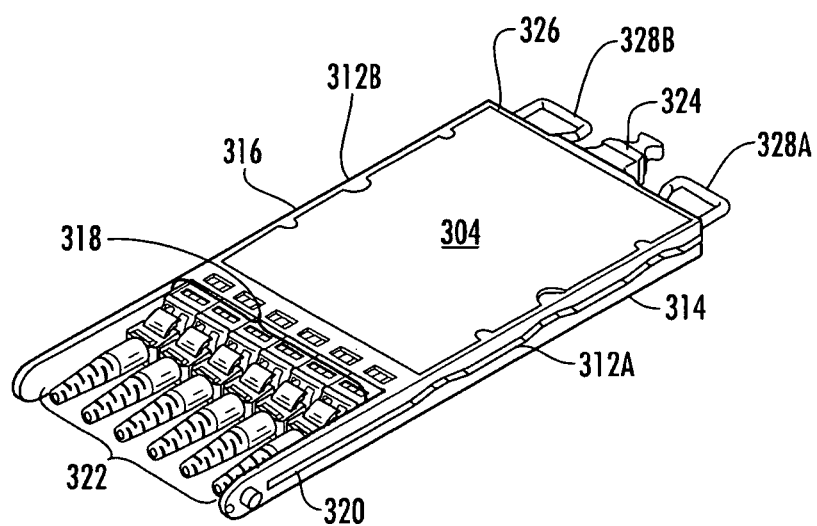
FIG. 30 is a front perspective view of the fiber optic modules provided in the fiber optic equipment of FIG. 22.

FIG. 30 illustrates the fiber optic module 304 illustrated in FIGS. 28 and 29 in more detail. As illustrated therein, the fiber optic module 304 contains module rails 312A, 312B disposed on each side 314, 316 of the fiber optic module 304. The module rails 312A, 312B are adapted to be received into channels of the module rail guides 306 to support the fiber optic modules 304. Each fiber optic module 304 is independently movable about the module rail guides 306. Intermediate fiber optic equipment trays are not provided. The fiber optic module 304 contains a series of fiber optic adapters 318 disposed on a front end 320 of the fiber optic module 304. A series of fiber optic connectors 322 may be connected to the fiber optic adapters 318 to establish fiber optic connections. A fiber optic adapter 324 is disposed in a rear end 326 of the fiber optic module 304 such that a fiber optic connector 322 connected to the fiber optic adapter 324 will establish an optical connection with optical fibers connected to the fiber optic connectors 322. The fiber optic module 304 also contains a series of pulling loops 328A, 328B disposed on each side of the fiber optic adapter 324 that may assist in removing the fiber optic module 304 from the rear section 308 of the fiber optic equipment 300.

Figure 31:
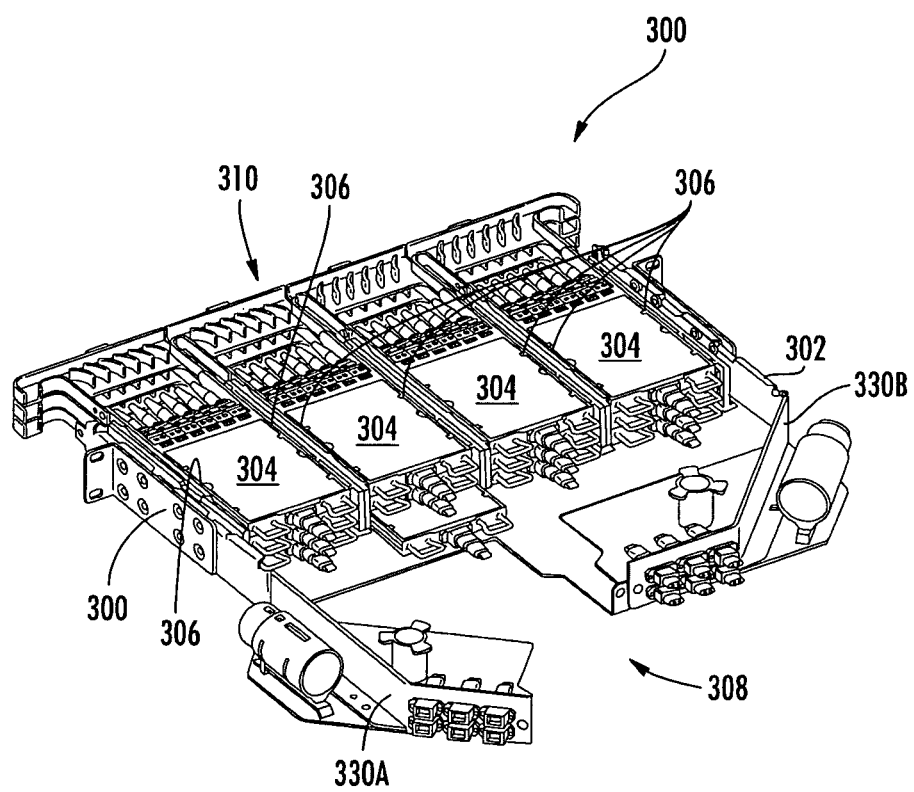
FIG. 31 is another rear perspective view of the fiber optic equipment supporting the rear-installable fiber optic modules of FIG. 28.

In order to install a fiber optic module 304 from the rear section 308 of the fiber optic equipment 300, as illustrated in FIG. 31, hinged portions 330A, 330B of the rear section 308 of the chassis 302 are pulled outward such that the module rail guides 306 are accessible to a technician. Thereafter, the fiber optic module 304 and its module rails 312A, 312B are inserted into channels in the module rail guides 306 as illustrated in FIG. 31. The fiber optic module 304 is then pushed forward within the module rail guides 306 until the fiber optic module 304 reaches the front end 310 of the chassis 302. Once the fiber optic modules 304 are installed as desired, the hinged portions 330A, 330B are closed.

Figure 32:
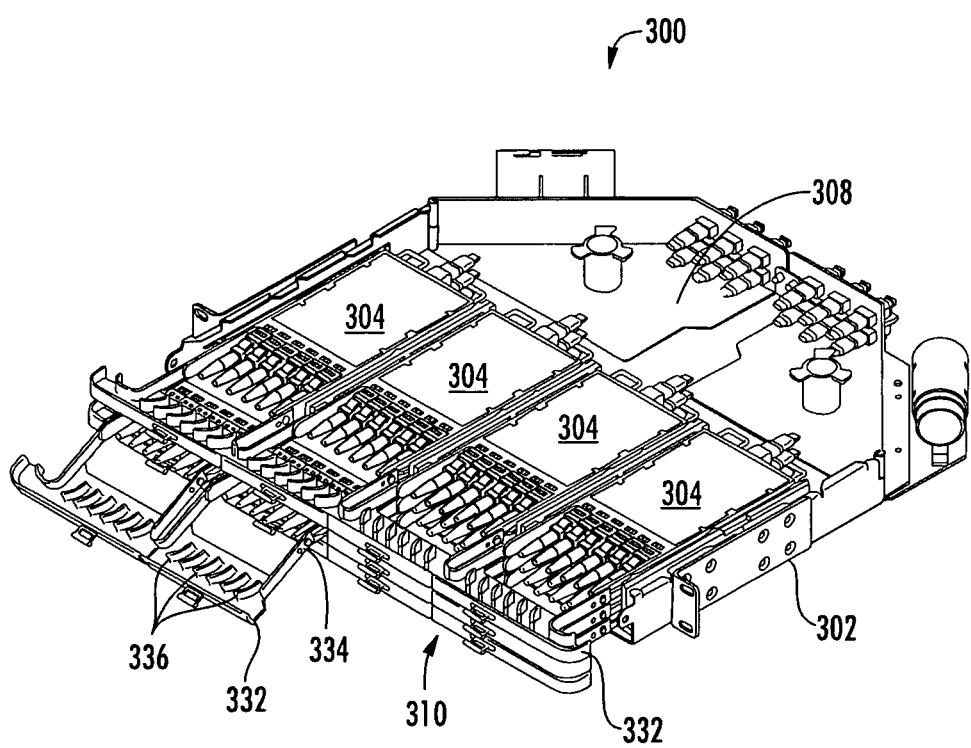
FIG. 32 is another front perspective view of the fiber optic equipment supporting the rear-installable fiber optic modules of FIG. 28 with a fiber routing tray extended and tilted downward to provide access to certain fiber optic modules.
Figure 33:
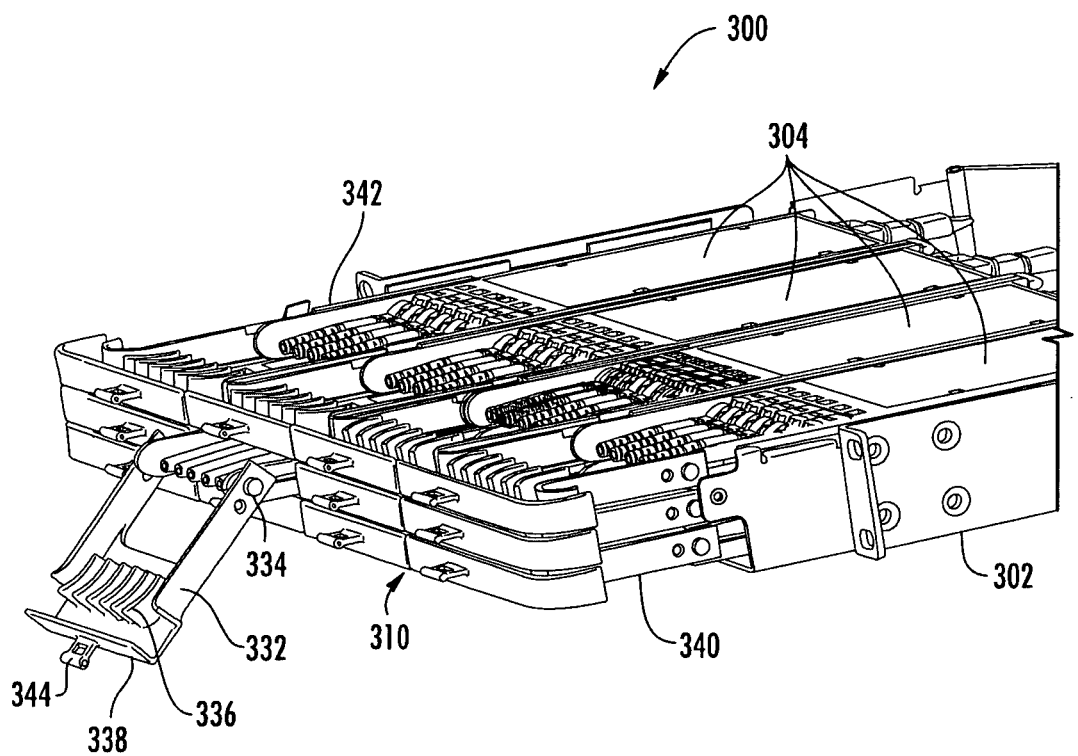
FIG. 33 is another front perspective view of the fiber optic equipment supporting the rear-installable fiber optic modules of FIG. 28 with the fiber routing tray extended and tilted downward.

In order to access the fiber optic connectors 322 of the fiber optic modules 304, a module guide tray 332, which is hingedly attached via hinges to the module rail guides 306, can be pulled forward and tilted downward as illustrated in FIG. 32. Each fiber optic module 304 has its own module guide tray 332 such that each fiber optic module 304 is individually accessible and independently movable about the module rail guides 306. The module guide tray 332 may contain a series of fiber routing guides 336 that support routing of connectorized fiber optic cables (not shown) connected to the fiber optic adapters 318 of the fiber optic module 304. FIG. 33 illustrates a side perspective view illustrating more detail regarding the module guide tray 332. The module guide tray 332 is pulled forward and hingeably tilted via hinge 334 downward to access the fiber optic adapters 318 of the fiber optic modules 304. The module guide tray 332 may contain a U-shaped flange 338 to allow optical fibers to be routed therein to either the left or right of the tray to the sides 340, 342 of the chassis 302. Further, a handle 344 may be provided and attached to the module guide tray 332 to allow for pulling and pushing for easy translation of the fiber optic module 304.

Figure 34:
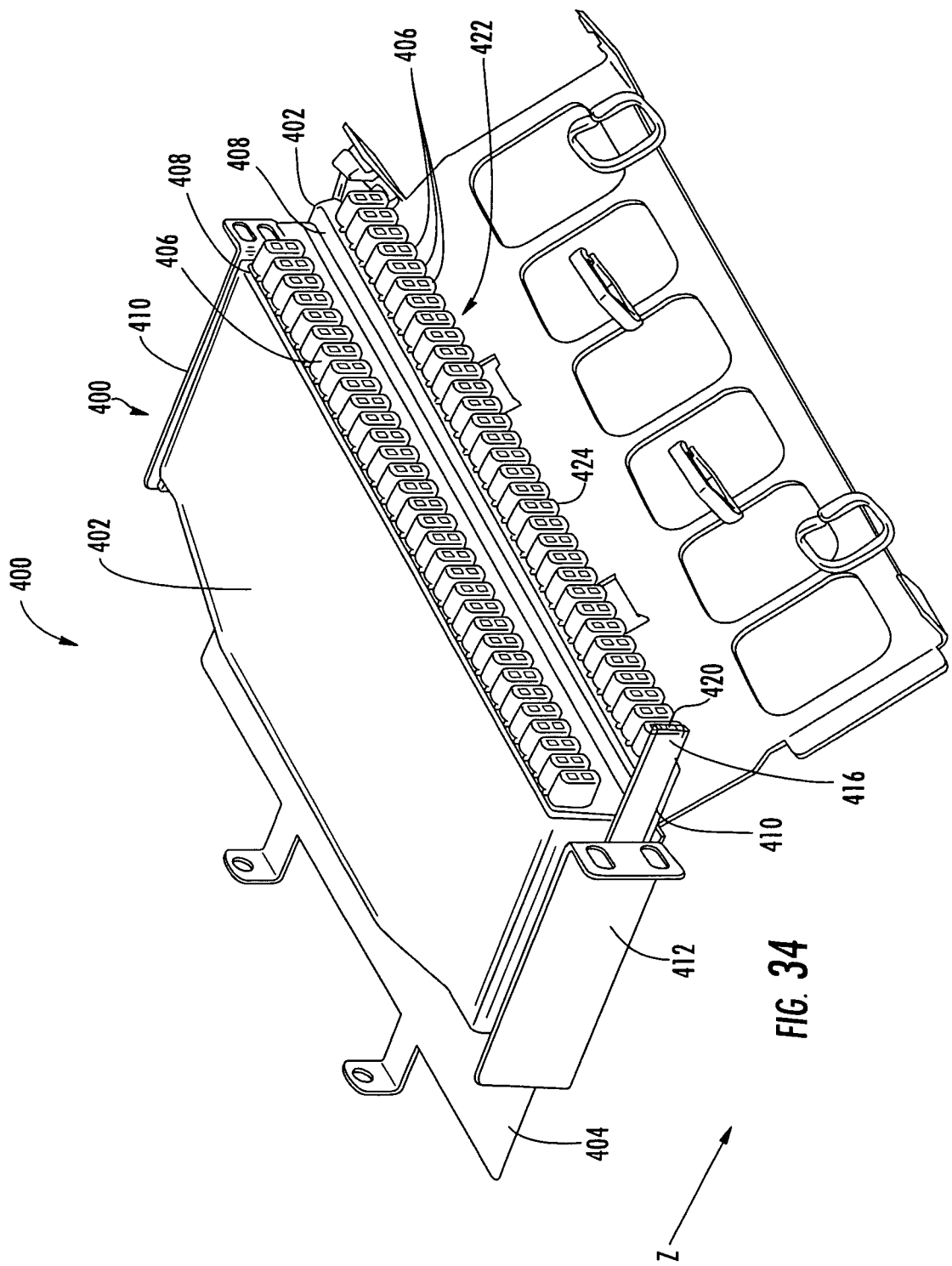
FIG. 34 is a front perspective view of another exemplary fiber optic equipment supporting rear-installable fiber optic modules.
Figure 35:
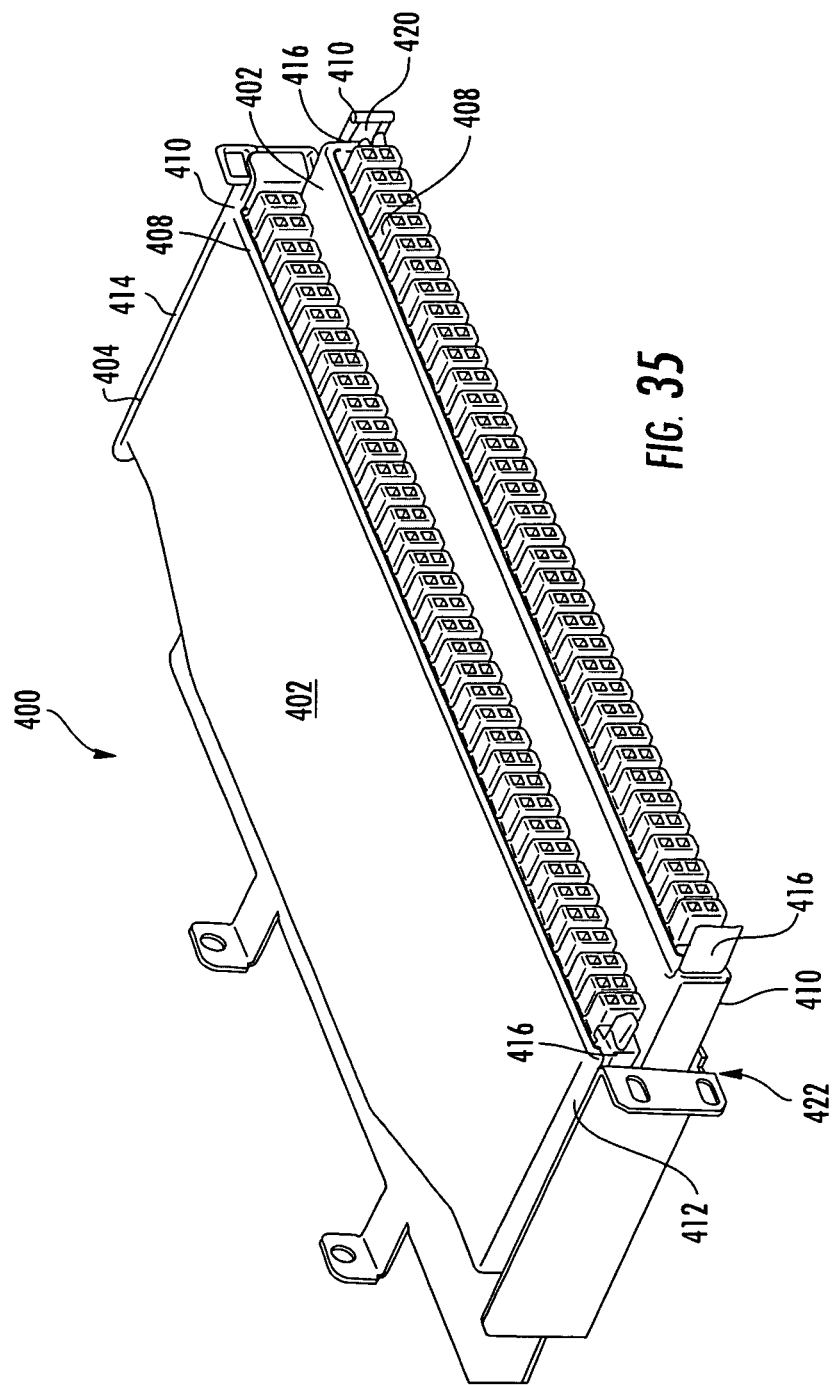
FIG. 35 is another front perspective view of another exemplary fiber optic equipment supporting rear-installable fiber optic modules.

FIGS. 34 and 35 illustrate yet another embodiment of fiber optic equipment 400. In this embodiment, a module guide system is provided to allow fiber optic modules 402 to translate independently of each other about a chassis 404 outward in the Z-axis direction. As illustrated herein, two (2) fiber optic modules 402 are provided. Each fiber optic module 402 contains a series of fiber optic adapters 406 disposed in a front end 408 of the fiber optic module 402. A module rail guide 410 is disposed in the fiber optic equipment 400 for each fiber optic module 402. As illustrated in FIGS. 34 and 35, two fiber optic modules 402 are provided that expand the entire width of the chassis 404. Thus, no intermediate module rail guides 410 are necessary or provided in the fiber optic equipment 400. Only two (2) module rail guides 410 are disposed on a first end 412 and a second end 414 of the chassis 404, although intermediate module rail guides can be provided if the fiber optic equipment 400 is designed to support multiple fiber optic modules in a single level or plane. Each fiber optic module 402 comprises a module rail 416 that is configured to be disposed within a channel 420 of the module rail guides 410. In this manner, the fiber optic modules 402 may be rear-installable and may be independently movable from each other along their dedicated module rail 416 so they can be pulled out towards a front end 422 of the fiber optic equipment 400 and chassis 404. This is illustrated in FIGS. 34 and 35 wherein the bottom fiber optic module 402 is pulled forward along its module rail 416 to provide access. After any access desired is completed, the bottom fiber optic module 402 can be pushed back in along its module rail 216 into the chassis 404 such that the front end 422 of the fiber optic module 402 will be disposed within the front end 408 of the chassis 404.

Many modifications and other embodiments of the invention set forth herein will come to mind to one skilled in the art to which the invention pertains having the benefit of the teachings presented in the foregoing descriptions and the associated drawings. These modifications include, but are not limited to, number or type of fiber optic modules, use of a fiber optic equipment tray, fiber optic connection type, number of fiber optic adapters, density, etc.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic apparatus, comprising:
    a chassis;
    a tray guide system disposed within the chassis and receiving a plurality of fiber optic equipment trays, wherein each of the plurality of fiber optic equipment trays includes
        opposite front and rear ends that are spaced apart from one other in a longitudinal direction, and
        opposite first and second ends that are spaced apart from one another in a lateral direction that extends crosswise to the longitudinal direction, and
        each of the plurality of fiber optic equipment trays is independently translatable in the longitudinal direction about the chassis; and
    a module guide system including a plurality of module guides respectively carried by the plurality of fiber optic equipment trays, wherein for each fiber optic equipment tray of the plurality of fiber optic equipment trays, the fiber optic equipment tray
        carries laterally spaced apart module guides of the plurality of module guides, and
        carries at least one fiber optic module that extends laterally between, and is movably supported by both of, the laterally spaced apart module guides carried by the fiber optic equipment tray, wherein
            the laterally spaced apart module guides, which are carried by the fiber optic equipment tray, are adapted for guiding the at least one fiber optic module so that the at least one fiber optic module is independently translatable in the longitudinal direction relative to the fiber optic equipment tray,
            the at least one fiber optic module includes at least one fiber optic adapter that extends in the lateral direction while the at least one fiber optic module extends laterally between, and is movably supported by both of, the laterally spaced apart module guides carried by the fiber optic equipment tray; and
            the at least one fiber optic module having a front end, a rear end, and an inside, the at least one fiber optic adapter disposed through the front end, and at least one optical fiber provided within the inside of the at least one fiber optic module connected to the at least one fiber optic adapter.

2. The fiber optic apparatus of claim 1, wherein the tray guide system is comprised of a plurality of tray guides each receiving a fiber optic equipment tray among the plurality fiber optic equipment trays.

3. The fiber optic apparatus of claim 1, wherein the tray guide system is comprised of a plurality of tray rail guides each receiving at least one tray rail disposed on a fiber optic equipment tray among the plurality fiber optic equipment trays.

4. The fiber optic apparatus of claim 1, further comprising a plurality of tray locking features each disposed adjacent a front end of the chassis, wherein each of the plurality of tray locking features are configured to releasably retain a fiber optic equipment tray among the plurality of fiber optic equipment trays.

5. The fiber optic apparatus of claim 1, further comprising:
    a plurality of fiber routing trays each disposed in the front end of each of the plurality of fiber optic equipment trays.

6. The fiber optic apparatus of claim 5, wherein each of the plurality of fiber routing trays are hingedly attached via a hinge mechanism to a front end of a fiber optic equipment tray among the plurality of fiber optic equipment trays.

7. The fiber optic apparatus of claim 6, wherein the hinge mechanism allows a fiber routing tray of the plurality of fiber routing trays to tilt about a front end of a fiber optic equipment tray among the plurality of fiber optic equipment trays when released.

8. The fiber optic apparatus of claim 5, further comprising a plurality of fiber routing guides disposed in each of the plurality of fiber routing trays.

9. The fiber optic apparatus of claim 5, wherein each of the plurality of fiber optic equipment trays is independently translatable about the chassis during operative access of the at least one fiber optic module.

10. The fiber optic apparatus of claim 1, wherein the plurality of module guides comprises:
    a first module guide disposed on a first end of a fiber optic equipment tray among the plurality of fiber optic equipment trays;
    a second module guide disposed on a second end of the fiber optic equipment tray opposite the first end; and
    at least one intermediate module guide disposed in the fiber optic equipment tray between the first module guide and the second module guide.

11. The fiber optic apparatus of claim 1, wherein the plurality of module guides comprises a plurality of module rail guides configured to receive a plurality of fiber optic modules in each of the plurality of fiber optic equipment trays.

12. The fiber optic apparatus of claim 11, wherein each of the plurality of fiber optic modules are independently translatable within a fiber optic equipment tray among the plurality of fiber optic equipment trays.

13. The fiber optic apparatus of claim 1, wherein the plurality of module guides comprises at least one module rail guide configured to receive at least one module rail disposed in a fiber optic module.

14. The fiber optic apparatus of claim 1, wherein the plurality of module guides are arranged in one or more columns of module guides carried by the plurality of fiber optic equipment trays.

15. The fiber optic apparatus of claim 1, wherein the plurality of module guides are arranged in one or more rows of module guides carried by the plurality of fiber optic equipment trays.

16. The fiber optic apparatus of claim 1, further comprising at least one module locking feature disposed adjacent a front end of each of the plurality of fiber optic equipment trays, each of the at least one module locking feature configured to interlock a fiber optic module among the plurality of fiber optic modules to a fiber optic equipment tray among the plurality of fiber optic equipment trays when the fiber optic module is disposed adjacent the front end of the fiber optic equipment tray.

17. The fiber optic apparatus of claim 16, wherein the at least one module locking feature is comprised of at least one detent feature attached to each of the plurality of fiber optic equipment trays, the at least one detent feature configured to interlock with a module latch disposed in the fiber optic module.

18. The fiber optic apparatus of claim 1, wherein for each fiber optic equipment tray of the plurality of fiber optic equipment trays:
    the at least one fiber optic module carried by the fiber optic equipment tray is a first fiber optic module;
    the laterally spaced apart module guides that are carried by the fiber optic equipment tray are a first pair of the module guides that are carried by the fiber optic equipment tray;
    the fiber optic equipment tray carries a second pair of module guides of the plurality of module guides, and the module guides of the second pair of module guides are laterally spaced apart from one another; and
    the fiber optic equipment tray carries a second fiber optic module that extends laterally between, and is movably supported by both of, the module guides of the second pair of module guides, so that the second fiber optic module is independently translatable in the longitudinal direction relative to both the fiber optic equipment tray and the first fiber optic module.

19. The fiber optic apparatus of claim 18, wherein for each fiber optic equipment tray of the plurality of fiber optic equipment trays, the first fiber optic module carried by the fiber optic equipment tray is positioned beneath the second fiber optic module carried by the fiber optic equipment tray.

20. The fiber optic apparatus of claim 1, wherein each of the plurality of fiber optic equipment trays is independently translatable about the chassis during operative access of the at least one fiber optic module.

\* \* \* \* \*